US008688676B2

(12) United States Patent (10) Patent No.: US 8,688,676 B2
Rush et al. (45) Date of Patent: Apr. 1, 2014

(54) SOURCE CODE SEARCH ENGINE

(75) Inventors: Darren Rush, Santa Monica, CA (US); Ankur Bulsara, Los Angeles, CA (US)

(73) Assignee: Black Duck Software, Inc., Waltham, MA (US)

(*) Notice: Subject to any disclaimer, the term of this patent is extended or adjusted under 35 U.S.C. 154(b) by 0 days.

(21) Appl. No.: 12/582,680

(22) Filed: Oct. 20, 2009

(65) Prior Publication Data

US 2010/0106705 A1 Apr. 29, 2010

Related U.S. Application Data

(63) Continuation of application No. 11/663,417, filed as application No. PCT/US2005/033624 on Sep. 20, 2005, now abandoned.

(51) Int. Cl.
*G06F 7/00* (2006.01)
*G06F 17/30* (2006.01)

(52) U.S. Cl.
USPC ............................ 707/706; 707/722; 707/748

(58) Field of Classification Search
USPC ......................................... 707/706, 722, 748
See application file for complete search history.

(56) References Cited

U.S. PATENT DOCUMENTS

| 4,558,413 | A | 12/1985 | Schmidt et al. |
| 5,651,111 | A * | 7/1997 | McKeeman et al. ......... 714/38.1 |
| 5,937,406 | A | 8/1999 | Balabine et al. |
| 6,240,412 | B1 | 5/2001 | Dyko et al. |
| 6,253,199 | B1 | 6/2001 | Wakio et al. |
| 6,305,008 | B1 | 10/2001 | Vaidyanathan et al. |
| 6,341,288 | B1 | 1/2002 | Yach et al. |
| 6,367,068 | B1 | 4/2002 | Vaidyanathan et al. |
| 7,167,870 | B2 | 1/2007 | Avvari et al. |
| 7,171,646 | B2 | 1/2007 | Charisius et al. |
| 2002/0059185 | A1 | 5/2002 | Woo |
| 2002/0178434 | A1 | 11/2002 | Fox et al. |
| 2003/0033379 | A1 | 2/2003 | Civanlar et al. |
| 2003/0056192 | A1 | 3/2003 | Burgess |
| 2003/0120711 | A1 | 6/2003 | Katz |
| 2004/0031015 | A1 * | 2/2004 | Ben-Romdhane et al. ... 717/107 |
| 2004/0230616 | A1 | 11/2004 | Kruy et al. |
| 2004/0267756 | A1 | 12/2004 | Bayardo et al. |
| 2005/0091612 | A1 | 4/2005 | Stabb et al. |
| 2005/0262056 | A1 * | 11/2005 | Hamzy et al. ..................... 707/3 |
| 2006/0048093 | A1 * | 3/2006 | Jain et al. ....................... 717/104 |

(Continued)

OTHER PUBLICATIONS

Black Duck, Koders.com (http://web.archive.org/web/20040901230536/http://www.koders.com/), Sep. 1, 2004, Koders, p. 1.*

(Continued)

*Primary Examiner* — Etienne Leroux
*Assistant Examiner* — Jared Bibbee
(74) *Attorney, Agent, or Firm* — Perkins Coie LLP

(57) ABSTRACT

In an embodiment, a method of operating a software search engine is provided. The method includes populating a software code database from one or more sources of source code. The method also includes receiving a search query for a software code search engine (525). The method further includes searching the software code database with the search query (530). Moreover, the method includes presenting results of the searching (550). Additionally, the method includes tracking reuse of code portions of the software code database. Also, the method includes reporting on usage of code portions of the software code database (560).

59 Claims, 18 Drawing Sheets

(56) References Cited

U.S. PATENT DOCUMENTS

2006/0101443 A1     5/2006   Nasr
2007/0006152 A1     1/2007   Ahmed et al.
2007/0294264 A1    12/2007   Bayardo et al.
2008/0077558 A1*    3/2008   Lawrence et al. ................ 707/3

OTHER PUBLICATIONS

Black Duck, Koders.com (http://web.archive.org/web/20100908160350/http://www.koders.com/?s=asp.net&_%3Abtn=Search&_%3Ala=*&_%3Ali=*), Sep. 1, 2004, Koders, p. 1-7.*
European Search Report EP 05 79 8553 dated Sep. 24, 2008; p. 1.
Gleditsch and Gjermshus; Excerpt from LXR 0.9.3; [On-line]; Sep. 4, 2004; pp. 1-3; XP002496981; Retrieved from the Internet; URL: http://downloads.sourceforge.net/lxr/lxr-0.9.3.tgz>; [retrieved on Sep. 23, 2008]; the whole document.
International Search Report PCT/US05/33624 dated Feb. 17, 2006; p. 1.
Sourceforge.net; "LXR Releases"; [On-line]; Sep. 23, 2008; XP002496982; Retrieved from the Internet: URL:http://sourceforge.net/project/showfiles.php?group_id=27350&package_id=19088>; retrieved on Sep. 23, 2008.
Office Action mailed Sep. 23, 2008 for related parent U.S. Appl. No. 11/663,417.
Office Action mailed May 20, 2009 for related parent U.S. Appl. No. 11/663,417.

* cited by examiner

US 8,688,676 B2

SOURCE CODE SEARCH ENGINE

CLAIM OF PRIORITY

This application is a Continuation of U.S. patent application Ser. No. 11/663,417, filed Sep. 11, 2007, entitled "Source Code Search Engine," which claims the benefit of National Stage PCT/US2005/033624, filed Sep. 20, 2005, entitled "Source Code Search Engine, and which are expressly incorporated by reference herein.

BACKGROUND

Development of software can be a tedious and time-consuming business. Software applications typically all do the same basic manipulations of data. The variation in how those manipulations occur and what the data represents leads to variety in software. Thus, it is not at all unusual to use the same software routines or components in a variety of different applications.

While the same routines may be used, they may have variations which make the individual instances of a routine slightly different. Alternatively, the same routine may be plugged into a different (or related) application when the same type of data is processed. Thus, it may be useful to provide a method of finding existing software code during development of software.

Finding reusable software code is potentially simple. To make it simple, one must have an organized list of software components already in existence and a knowledge of what these components are. However, no typical software engineer has such information for all software the engineer has developed individually. Moreover, groups of software developers generally have only vague knowledge of what members of the group have developed, and little knowledge of what has been developed outside the group. Thus, it may be useful to develop a system allowing organized access to software source code from a variety of software applications or source code repositories. Moreover, it may be useful to categorize or otherwise organize such information, allowing for access to the source code in an efficient manner.

SUMMARY

Embodiments are described in an illustrative rather than restrictive manner. The invention should not be understood as limited to the embodiments described. Moreover, features of one embodiment may be used in conjunction with other embodiments in which those features are not described. Various features of one embodiment may enhance other embodiments, rather than conflicting with features of other embodiments.

In an embodiment, a method of operating a software search engine is provided. The method includes populating a software code database from one or more sources of source code. The method also includes receiving a search query for a software code search engine. The method further includes searching the software code database with the search query. Moreover, the method includes presenting results of the searching. Additionally, the method includes tracking reuse of code portions of the software code database. Also, the method includes reporting on usage of code portions of the software code database.

In yet another embodiment, a method is provided. The method includes receiving a search query for a software code search engine. The method also includes searching a software code database with the search query. The software code database is populated with source code from one or more sources of source code. The method further includes presenting results of the searching.

In another embodiment, a system is provided. The system includes a software code database. The software code database is populated with source code from one or more sources of source code. The system further includes a search engine coupled to the software code database. The system also includes a user interface coupled to the search engine.

BRIEF DESCRIPTION OF THE DRAWINGS

The present invention is illustrated in an exemplary manner by the accompanying drawings. The drawings should be understood as exemplary rather than limiting, as the scope of the invention is defined by the claims.

DETAILED DESCRIPTION

Figure 1:
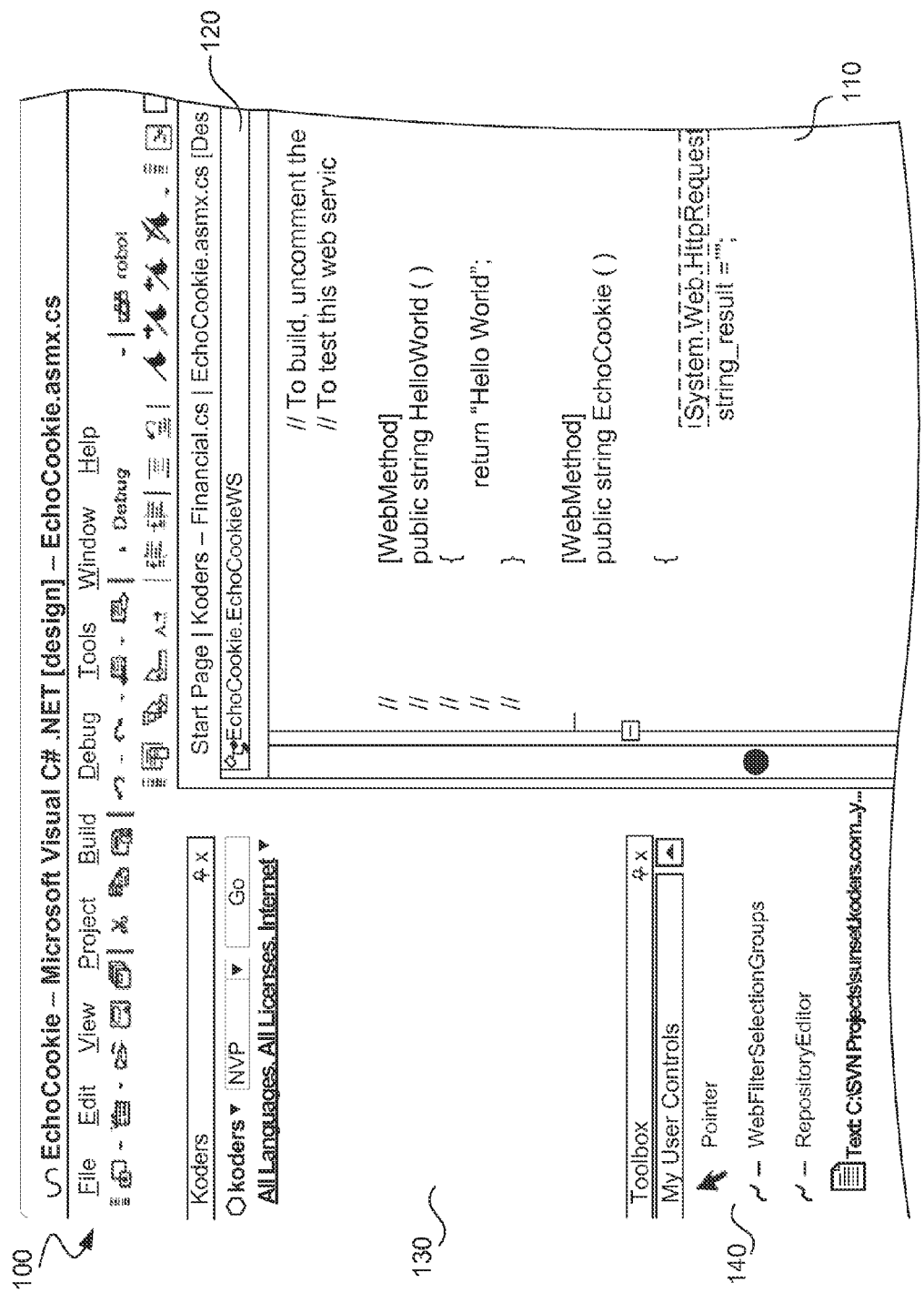
FIG. 1: Display of an embodiment of the component integrated within an IDE.

A system, method and apparatus is provided for a source code search engine. In many embodiments, a single search interface to multiple source code repositories or storage systems is provided. The search interface may search source code on a variety of levels of detail. The single search interface may further rank the source code based on usage and reuse. The specific embodiments described in this document represent exemplary instances of the present invention, and are illustrative in nature rather than restrictive.

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram faun in order to avoid obscuring the invention.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment, nor are separate or alternative embodiments mutually exclusive of other embodiments.

Preferably, one or more of the following features is provided. General source code searching (such as full-text searching) is one such feature. Syntax level source code searching may also be useful—searching based on grammatical patterns of source code, rather than exact text matches. Similarly, searching based on associated metadata may be useful. Moreover, providing feedback about what code is useful based on tracking of reuse statistics for code portions may be useful. In order to provide such feedback, tracking of reuse must occur, too.

In an embodiment, a method of operating a software search engine is provided. The method includes populating a software code database from one or more sources of source code. The method also includes receiving a search query for a software code search engine. The method further includes searching the software code database with the search query. Moreover, the method includes presenting results of the searching. Additionally, the method includes tracking reuse of code portions of the software code database. Also, the method includes reporting on usage of code portions of the software code database.

In yet another embodiment, a method is provided. The method includes receiving a search query for a software code search engine. The method also includes searching a software code database with the search query. The software code database is populated with source code from one or more sources of source code. The method further includes presenting results of the searching.

In another embodiment, a system is provided. The system includes a software code database. The software code database is populated with source code from one or more sources of source code. The system further includes a search engine coupled to the software code database. The system also includes a user interface coupled to the search engine.

A search engine for searching the contents of software source code files found in local or remote source code repositories is provided in one embodiment. The search engine connects to each repository using the appropriate protocol and copies versions of the project source code files to a local copy. An indexing system indexes each file to extract relevant meta-data and create statistics that can later be used as criteria for searches. A search system that allows users or other systems (computers) to search the indexes for files that contain the specified search criteria. A ranking system that presents matching search results in a most-relevant to least-relevant order may also be employed.

Embodiments relate generally to construction of search engines for source code, and some embodiments relate more particularly to search engines that index source code to extract embedded meta data and rank results in an intelligent way that is most relevant to the user.

Various features may be incorporated into a variety of embodiments of source code search engines and related software. An initial discussion of an embodiment of a source code search engine is provided, along with various embodiments which are illustrated in the figures and described. Features from one embodiment may be integrated into other embodiments, as the various features generally enhance, rather than conflict with, features of other embodiments.

In addition to a full-text analysis of each file, the indexing engine may also analyze each file based on the programming language it is written in—essentially parsing and compiling the file to extract its programmatic definition and resolving references to external components. This semantic representation of the file is used to assist users in understanding the higher-level functions provided by the source code, and to enable the system to cross reference entities in the file across files and projects.

After conducting a search, a user is presented with summaries of files with matching results. In some embodiments, clicking a file from the list of results displays that file contents in a code-colored fashion—and also highlights the search terms. From this code view, the user can click a link to download the entire file or copy and past portions of the file into their application.

When the user downloads the file, the system registers this as an instance of reuse and correlates the reuse with the previous search conducted by the user. When a user selects a portion of the contents of the file in order to cut and paste, the system detects this and presents the user with a dialog box confirming that they wish to copy part of the file. The user can choose OK, Cancel or Yes, No. choosing No or Cancel will disable the copy and paste function. Clicking Yes, or OK, will enable the copy and paste function and register an instance of reuse on the system. Again this reuse will be correlated to the previous search conducted by the user.

By indexing and parsing the code for each file, one may identify the definitive entities and members referenced by each statement in the code. This information allows developers to easily find the location where an entity is defined, and to identify other locations where the entity is referenced. While this functionality is generally available in IDE applications within the scope of a project, one can apply this principle to all projects that have been indexed, whether from internal version control systems, internal file systems, or external sources of software code.

A side effect of this enables keeping a reference count for each entity. One may sum these reference counts at the file level and for the purpose of scoring results, use this reference count to determine which files are likely more reusable matches than other files.

The scoring mechanism uses a formula to calculate the score for each file matching a search. The score is used to sort the display of resulting files to the end user.

In one approach, in general, files will score higher if:
1. They have been reused by developers previously
2. They contain the definition for an entity which is referenced by other projects
3. They have a high frequency of matching terms specified in the search The following terms may be used in one approach:
ReuseScore—the number of times a file has been downloaded or a portion of the file has been copied.
ReferencedEntityCount—the number of references to the entities in this file from other files within the project and within the entire index.

WordFrequencyCount—the number of times a search term is found divided by the number of words in the file*100;

$$\text{Score} = ((ReuseCount > 0) * 10000 + ReuseCount) + \\ ((ReferencedEntityCount > 0) * 5000 + ReferencedEntityCount) + \\ WordFrequencyCount$$

This composite formula, in this particular approach, ensures that files that have been reused are displayed first, followed by files that have many external references to the entities defined within, followed by files that have a high frequency of the search terms contained within the content.

Other approaches to a score or ranking of source code may also be useful. Within the approaches outlined above, different formulas may be used under various circumstances.

In addition to the basic lines-of-code analysis for source code files, the number of lines of code may be aggregated at the project level to estimate the approximate value of the project. Using generally accepted industry assumptions, the value of a project can be calculated from the following formula:

$$\text{Project Cost} = [TLOC]/1000 * [EKLOC] * [FP] * [LC]$$

Where
TLOC=Total Lines of Code for entire project
EKLOC=Number of person-months to write 1000 lines of code
FP=% of functionality needed by the developer who will use the project
LC=Labor Cost for 1 developer for 1 month (average)

From the project view screen the user can adjust some of the variables to their liking, then click Recalculate to see the new Project Cost. This is an estimate of the cost that would be incurred if a development team were to build the equivalent functionality themselves.

In addition to providing a current view of a software project, the system can also provide historical analysis by using stored snapshots of the project at previous points in time. Specifically, version control systems which an application connects to store all the past versions of each file in the project. Using the indexing system against this historical data can provide new analysis. This may include project and file line counts over time—users can see how the project grew over by plotting the total lines of code fox each version in the version control system. This data can be useful for understanding project progress. (Sometimes referred to as velocity) This data may also be broken out by developer. This analysis can be used to see how individual developers contributed to the project over time.

Since the system often knows the users who both created and are reusing a particular file, the system is potentially capable of sending notifications to both parties when the file has changed. There are at least two scenarios when this might be useful. One, the author(s) updates the file with bug fixes. The system notifies all users who have reused the file that changes have occurred, and gives them a summary of the changes since they reused the file. Two, a developer reuses the file and makes changes that the original author could benefit from. With the (reuse) users's permission, the system can notify the author(s) of the changes that have been made so the author can choose to integrate the changes back into the main project.

A set of features of an embodiment has been described. Various features as described below may be incorporated into such an embodiment, or other embodiments. Such features may include periodically taking local snapshots of software projects from Internet or other source locations. Indexing the source files to identify embedded meta-data and statistical information may then occur. Such information may include the programming language(s) for the file; number of lines of code, comments, mixed code and comments, and blank lines; length of the code; length of the comments; any embedded licenses such as GPL, LGPL; an xml fragment, embedded in the comments of the file—or in an ancillary file which describe the source file; and keywords used in the file and their frequency.

The system may then allow users to search the created indexes using any of the indexed data. In response, the system may present the search results using a scoring mechanism in a most-relevant to least relevant manner. Various scoring mechanisms may be used, including highest total uses of keywords indicated in search; DOCS score: ratio of comments stream length to code stream length; or File Duplicity Score: the number of times this file is referenced in other projects, for example.

The system may also track reuse of code in one or more ways. This may include tracking all instances of a user reusing or re-purposing a file. This may also include correlating searches with the results that were found to be useful for that particular search. Moreover, this may include notifying users who have reused a file of new changes and/or notifying the original author(s) of changes to a file made by a developer who is reusing the file.

Similarly, reporting on system usage may occur. This may involve providing analysis of searches and/or analysis of reuse. This may also involve providing search and reuse analysis by demographic or community group, for example.

Other embodiments may use a variety of techniques to achieve similar results. A method of connecting to source code repositories and downloading updates of project source code files can be involved. This may include enumerating a list of source code repositories containing connection and authentication information. This may further include connecting to each repository using the proper protocol. Similarly, this may involve issuing commands to download the project to a local copy. Alternatively, this may involve issuing commands to ensure that the local source code project files are up-to-date with the files in the remote repository (synchronizing, for example).

A method of indexing each of the local copies of the source code project files may also be involved. Such a method may include determining the type of source code contained in each file by utilizing the file extension of the file to determine its type. This may also include indexing the file using the appropriate indexing system to determine if it contains relevant code and comment sections. Moreover, this may include using a custom indexing process for each type of source code file.

The method of indexing generally produces an index. In some instances, the index produced contains a list of keywords found in the source code file with a corresponding count of the frequency of each keyword in the file. This may be accomplished by parsing the file using a regular expression system to find matches of each word using a pattern matching expression that is specific to the syntax of the particular programming language used in the file. This may then proceed by maintaining a table of words and their frequency in the file, adding each new word found to the table with a frequency count of 1, and incrementing the frequency count in the word table for each additional time the word is found in the file contents.

Alternatively, the index may contain: total number of lines of text in the file, total number of lines containing source code in the file, total number of lines containing comments in the file, total number of lines containing both source code and comments (labeled as mixed), and the total number of lines that are empty or blank in the file. Each of the aforementioned statistics may be determined by parsing the file using a regular expression pattern matching system with match patterns specific to the programming language found in the file. Such patterns may be determined for each language by the syntax specification for the language.

Similarly, the index produced may contain the total length of the source code in the file. This may be determined by removing all blank lines, comments, and also removing all formatting specific information in the file as required by the syntax specification for the specific programming language. In many programming languages, formatting specific information may include: whitespace characters such as a space character (ASCII 32) or a tab character (ASCII 9). The index may also include the total length of the comments in the file, determined by removing all source code in the file and removing all formatting specific information in the file. Calculating a score (called DOCS herein) based on the ratio of $$\text{(Length of Comments)} / \text{(Length of Source Code)}$$

may then occur.

An index may also include primary programming languages used in the file. Similarly, an index may contain the name of a license infatuation contained in the file. This may be accomplished by searching the file for text that is known to be a part of well known licenses, and comparing the found text to the contents of the well known licenses, determining the best match based on keyword frequency and uniqueness of terms found in the text, for example. Additionally, the index may contain the name of any copyright information contained in the file. Such information may be found by searching the file comments for strings containing the term copyright or the copyright character.

A hashing algorithm may be used to produce a value based on the contents of the file that when compared to a hashcode produced by the contents of another file with identical contents—would be equal. Herein this value is known as the FileHashCode. This may preferably be accomplished using an invertable hash code.

The index may also contain the contents of an XML which provides author specific information about the file. Such information may be found by searching the comments of the file for appropriate starting <xml> and the corresponding ending </xml> tag. This may also involve removing any illegal comment characters from the body between the starting and ending tags. Alternatively, the actual xml tag containing the additional file information may be any of a subset of tags defined in public documents.

In some embodiments, a method for embedding file or project specific information directly in a source code file is provided. The method includes building an XML tag set providing the specific information. The method also includes embedding the XML tag set in the comments of a source code file. Alternatively, the method includes embedding a link to an ancillary file containing the XML tag set in the comments of the source code file. Similarly, in some embodiments, a method of allowing users to search the indexes to identify files that meet their search criteria by keyword, project, repository, license, programming language, or link to other projects may be provided.

A method of scoring results of search results to display files in a most relevant to least relevant fashion may also be provided in some embodiments. In some embodiments, the user can choose to sort results by a preferred scoring mechanism. This scoring method may be the DOCS value mentioned previously. Alternatively, this scoring method may be a Word Frequency Score (WFS) calculated as:

$$\text{Sum(Word Frequency of each Search term in the Resulting file)}$$

Similarly, the scoring method may be a File Reuse Score (FRS)

$$\text{FRS} = \text{sum(Files in the Index with same FileHashcode as resultant file)}$$

In various embodiments integration with an IDE may be desirable, and such implementations may include some or all of the following features:

Integrating with a text editor (IDE) to detect when software developers create or modify structural elements of a software application such as namespaces, classes, interfaces, functions, methods, properties or fields.

Performing a background search when these elements are created or modified against one or more external source code databases in order to identify existing software source code that is similar to or related to the defined element.

Indicating to the developer through visual or other means the number and nature of matching results.

Allowing the developer to easily access the results by clicking a message or typing a special keyboard combination.

Presenting the results in such a way that they may be easily copied and pasted from the results into the developers IDE.

Collecting statistics on searches and reused source code results in order to iteratively improve search results over time.

Embodiments relate generally to the construction of software components which enable text-editor applications to make recommendations to the user regarding the integration of external content which may be reusable in the document currently being developed, and more specifically to the application of such as system to the domain of software development.

Features of some embodiments include a software component that integrates with text editors designed specifically for software development—also known as integrated development environments (IDEs). The software component or module may be able to detect when a developer is creating or modifying defining elements of a software application such as namespaces, classes, interfaces, functions, methods, properties or fields. A related component may implement a system of searching one or more external databases containing source code to identify code that is similar to or related to the element that has been defined. This may work with a component implementing a system of notifying the developer of the number and nature of results which are found and a system of displaying results that enables the developer to easily copy-and-paste results into the application currently being developed. Searching may involve a system of indexing source code so that searching for similar or related source code can be performed quickly. This may also involve a system of recording searches and the results selected by developers in order to iteratively improve the ranking and display order of search results in the future.

Discussion of an embodiment with respect to its user interface may provide further insights into how a code search engine may be integrated with an IDE (integrated development environment). FIG. 1 illustrates display of an embodiment of a code search component integrated within an IDE. Interface 100 includes classic elements of an IDE along with a code search engine. Window 110 provides an editing environment for code. Location 120 provides an indication of what software code is currently being edited. Code search interface 130 provides an interface allowing for selection of search parameters. Codespace display 140 provides an illustration of the overall codespace in which development is occurring, with an indication of the context of the current code of window 110. In the illustration of FIG. 1, no search has occurred, and parameters allowing for search of all types of code are selected.

Source code comes in a variety of shapes, sizes and forms. Various portions of source code may be referred to as systems, applications, libraries, components, modules, object, classes, methods, routines, procedures, functions, or snippets, for example. Any one or more of these portions may be suitable for detection, or as a result of a search in various embodiments. Also, note that reuse of other types of computer data, such as general text for example, may be similarly handled with a search engine and document management system, for example.

Figure 2:
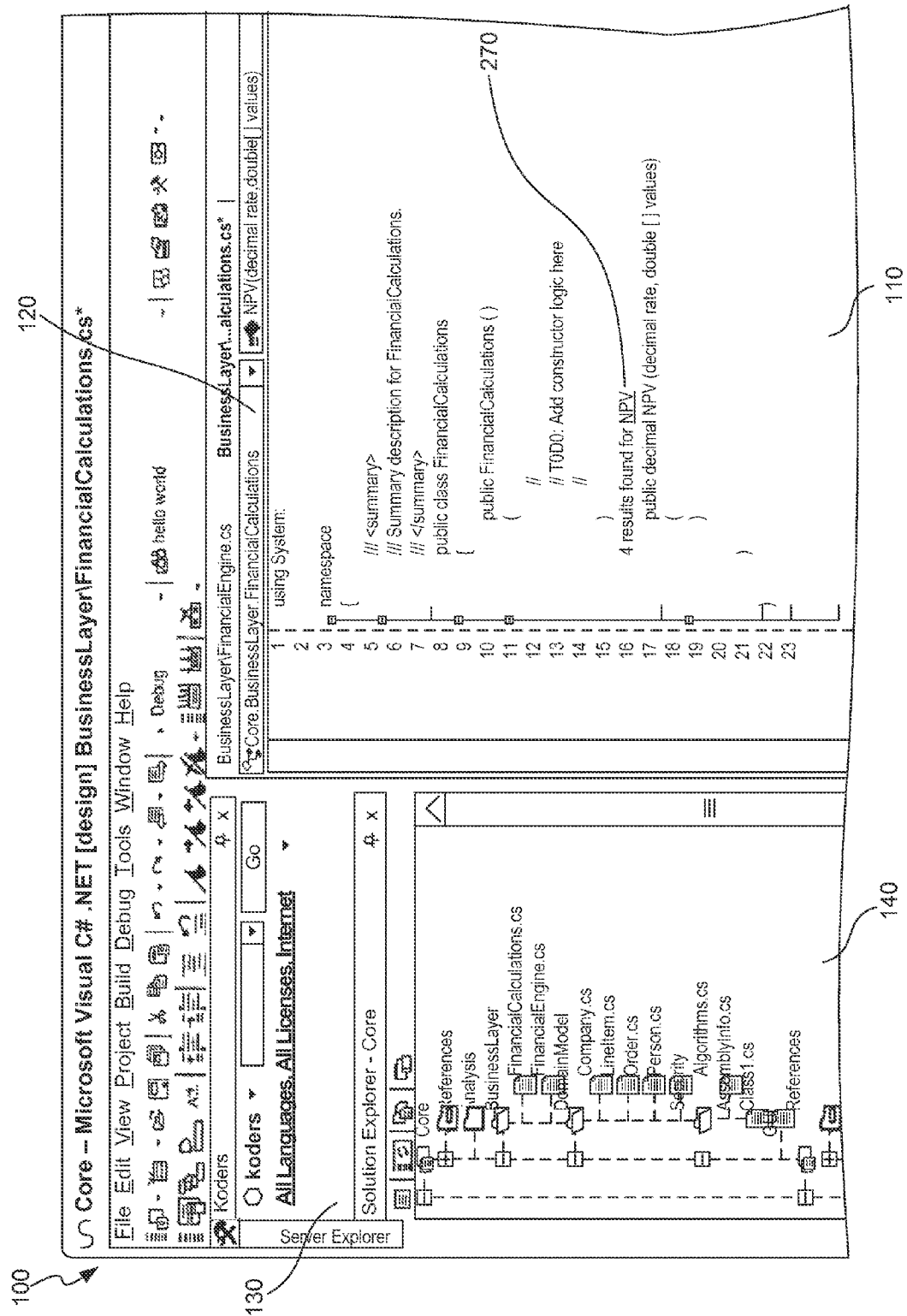
FIG. 2: An embodiment of notification of available search results displayed to user after creation of new method.

In response to either a request or changes in source code, a search may be initiated. Turning to FIG. 2, an embodiment of notification of available search results displayed to a user after creation of new method is displayed. Search notification icon 270 indicates that a potential match has been found for code currently being developed in window 110. The search is based on characteristics of code displayed in code display 110 of FIG. 1, and occurs in a background process while editing occurs. Searching may be triggered based on detection of new software code, or of a change in API of an existing method, object, function or other portion of code. Clicking on icon 270 leads to a display of software code which were found by the search.

Figure 3:
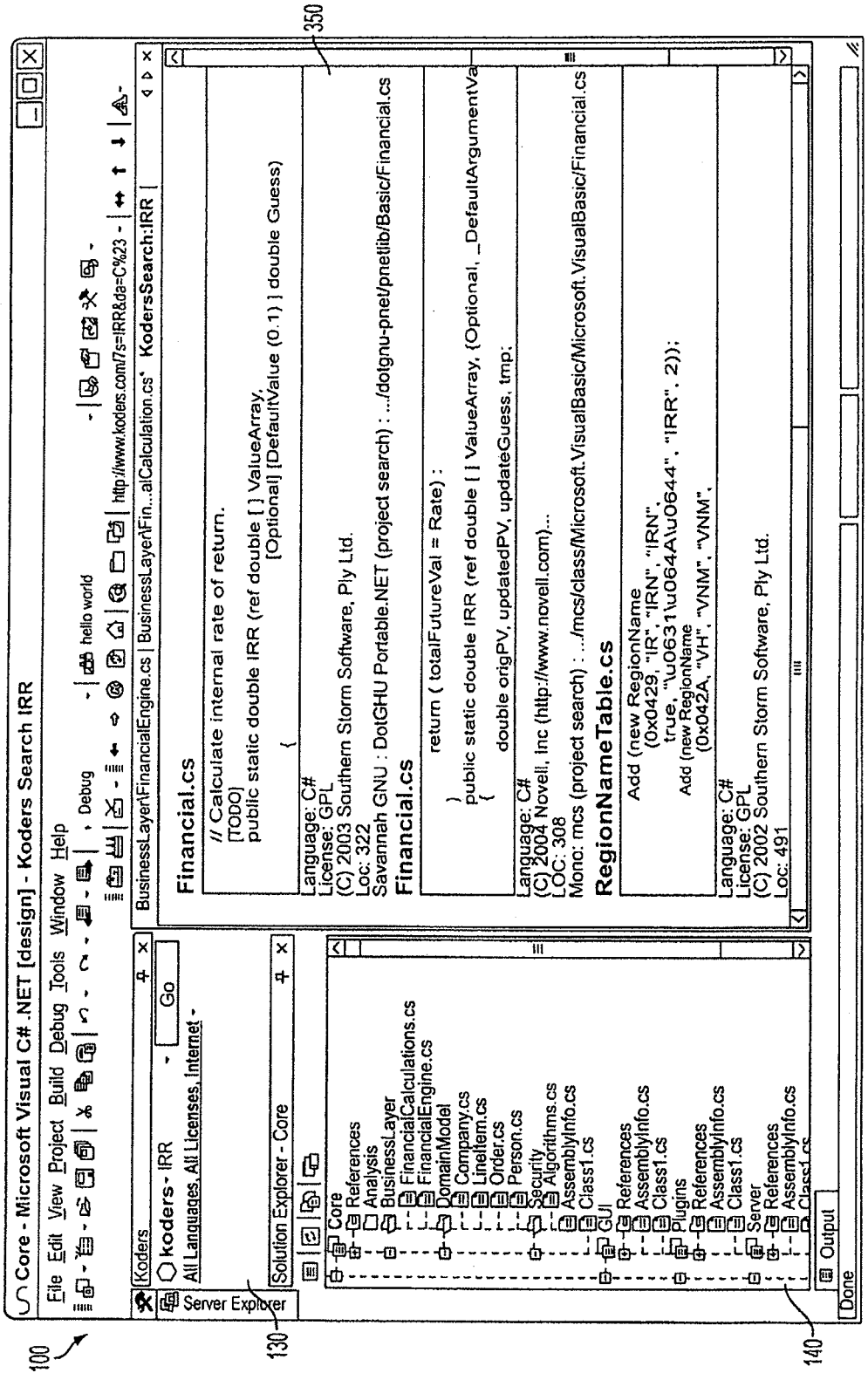
FIG. 3: An embodiment of a search results summary to (preferably) make it easy for a developer to visually filter results.

Alternatively, a listing of a variety of results may be provided. FIG. 3 provides an embodiment of a search results summary to (preferably) make it easy for a developer to visually filter results. Instead of showing all software code, a summary of results may be provided, as illustrated in display window 350. Each code portion is displayed with its API and information about where it may be found (and potentially what licensing restrictions it carries).

Figure 4A:
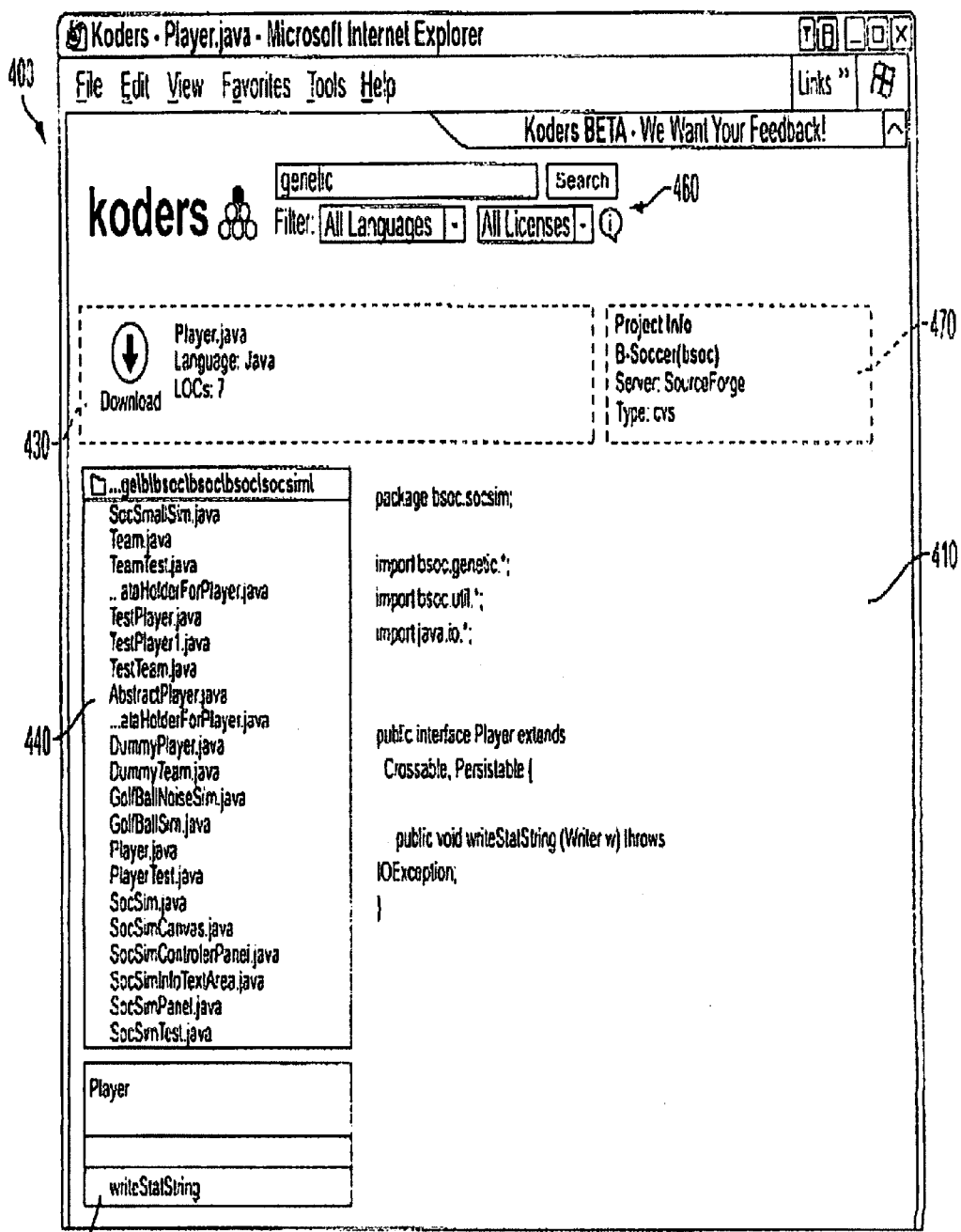
FIG. 4A: An embodiment of a detailed code view within a browser can be easily integrated into the current file via copy-and-paste.

A specific result may be further provided in a separate window. FIG. 4A illustrates an embodiment of a detailed code view within a browser which can be easily integrated into the current file via copy-and-paste. Interface 400 may be viewed in a browser such as Internet Explorer of Microsoft or Firefox, for example. Code 410 is the actual code of the portion. Project information 420 indicates where the code originated, and potentially what licensing restrictions are carried with the code. Language information 430 indicates what language the code is in, and potentially what requirements the code has for integration (e.g. language version, specialized libraries, etc.) Context information 440 indicates what other modules are available along with the instant module. Interface data 450 provides information about the API of the instant module. Also provided is an opportunity to refine a search in search interface 460, including specification of languages, licenses, and keywords, for example.

Figure 4B:
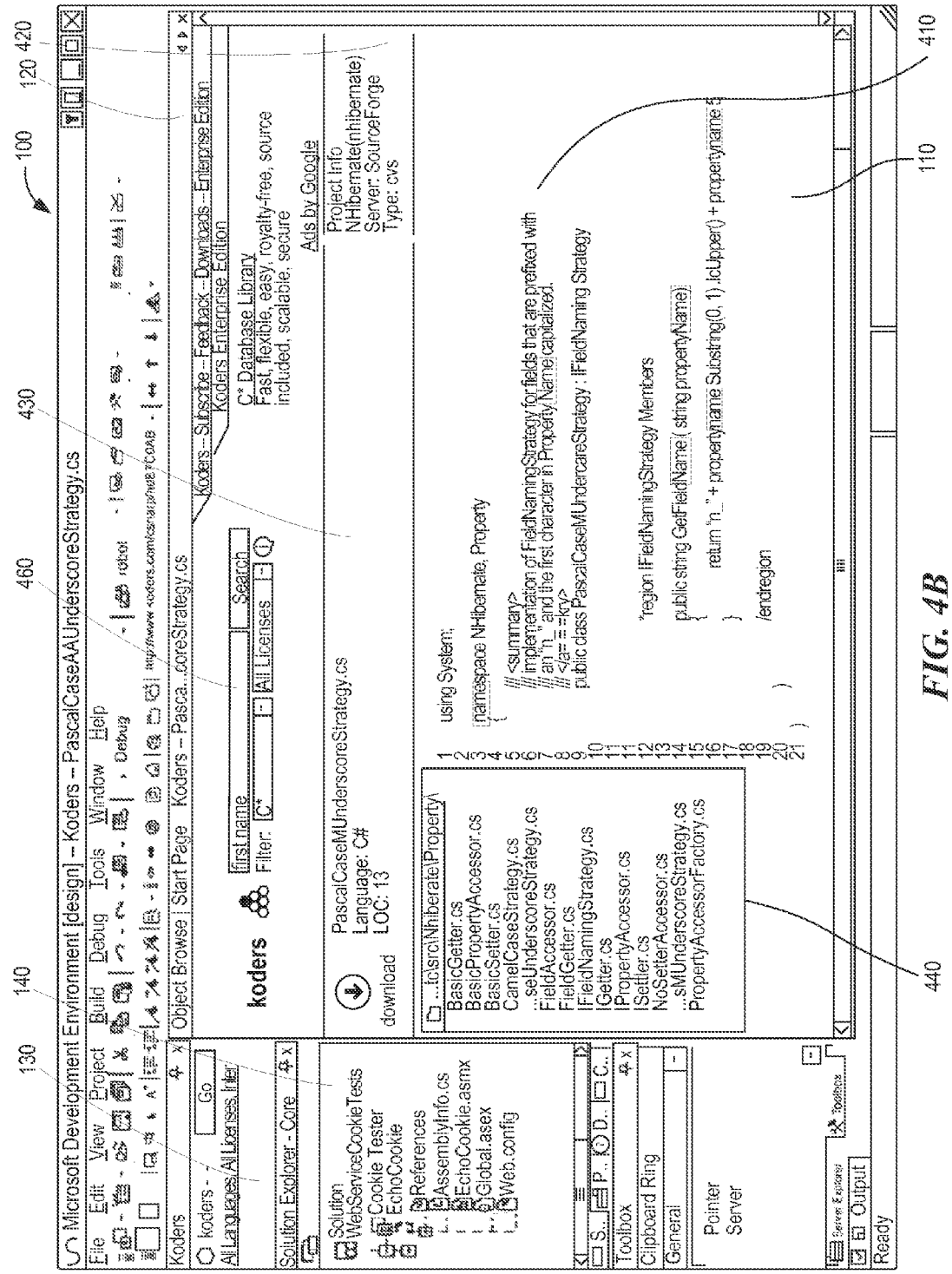
FIG. 4B: An embodiment of a detailed code view within an IDE.

FIG. 4B illustrates a similar interface to that of FIG. 4A as may be incorporated into a development environment (an IDE for example). Thus, the information about what software code is available may be displayed in conjunction with context information about development of a project. Material may be copy-and-pasted or otherwise integrated into the project.

Figure 5A:
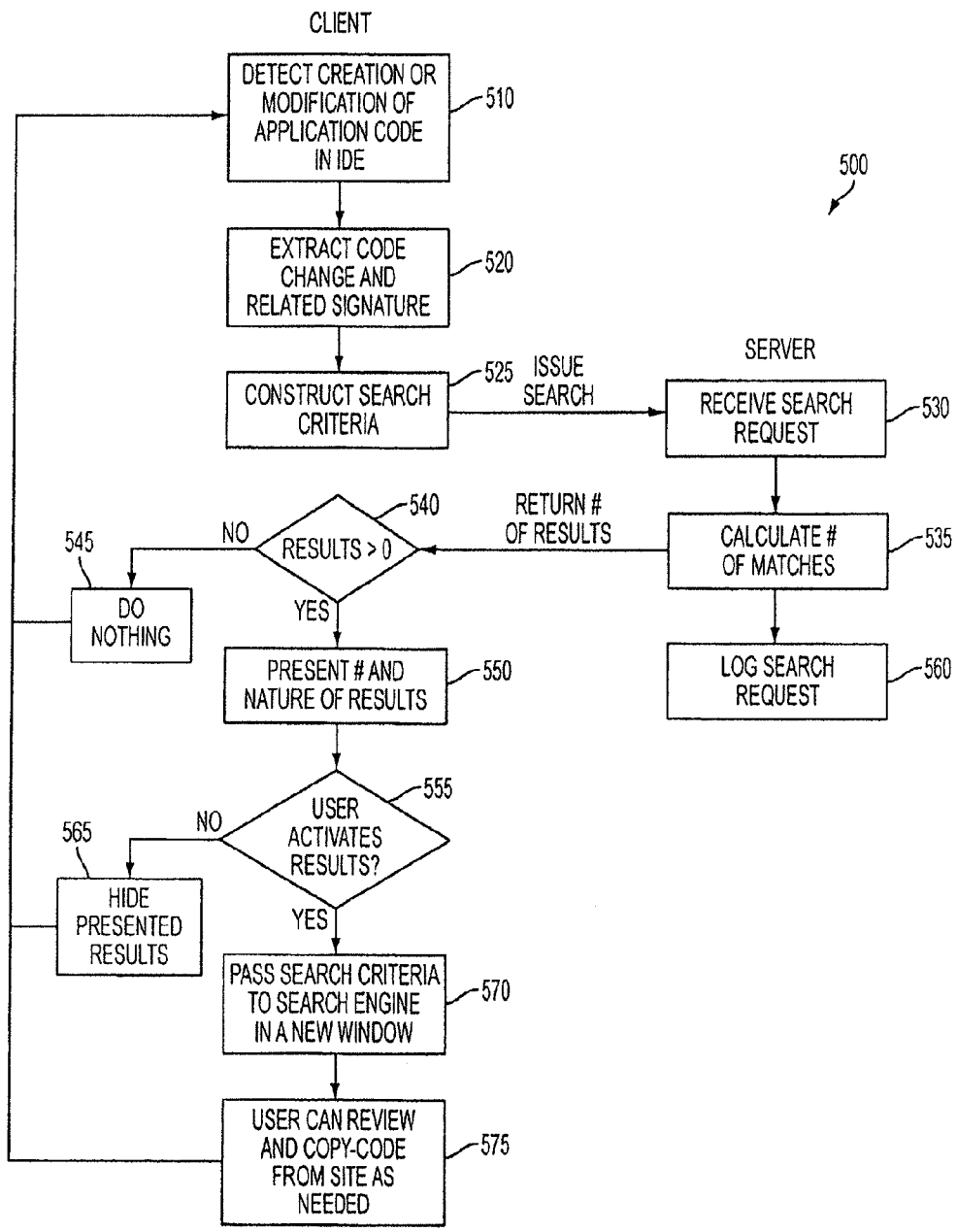
FIG. 5A: An embodiment of a process of automatically searching for software code.

A search may be initiated and performed either in reaction to writing code or responsive to a request. FIG. 5A provides an embodiment of a process of requesting software code. Process (method) 500 and other processes of this document are implemented as a set of modules, which may be process modules or operations, software modules with associated functions or effects, hardware modules designed to fulfill the process operations, or some combination of the various types of modules, for example. The modules of process 500 and other processes described herein may be rearranged, such as in a parallel or serial fashion, and may be reordered, combined, or subdivided in various embodiments.

A search request may be originated when a change is detected in a software module at module 510. Such a change may involve a change in parameters, editing the software code, or other changes discussed elsewhere in this document. Code information (search parameters) is extracted at module 520. Thus, an API or functions of software code may be extracted as a signature, for example. A search query or set of criteria are constructed at module 525 for submission to a search facility.

The search query is issued, and at module 530, the search request is received and executed. This may involve various search algorithms and database queries to find matches of varying quality. At module 535, the number of matches received is calculated and passed back to a client issuing the search query. At module 540, a determination is made as to how many results were found. If no results were found, the search is ignored at module 545 (presumably returning to module 510 to await detection of another change). Results of the search (if they exist) are presented to the user at module 550. A determination is then made at module 555 as to whether the user is activating (e.g. accessing) the search results. If not, at module 565, the results are hidden. Note that the results may be stored in a circular queue or other storage mechanism (data structure), allowing a user to backtrack after ignoring an initial notification to see what a search turned up. This allows for user second-guessing after, for example, realizing the software code may take more work than expected or remembering a prior piece of code which may be useful, for example.

If the search results are activated, in one embodiment, the search criteria and results are passed to a new window for review at module 570. At module 575, the user may then review the specifics of results, and copy-and-paste or otherwise integrate code into the present project, for example. Also, separate and apart from use of the search, statistics resulting from the search and user use of the search results may be stored at module 560, either in conjunction with the searches or after search and use of search results, for example. These statistics may simply be server-based (potentially only including search queries and results) or may be more inclusive.

Figure 5B:
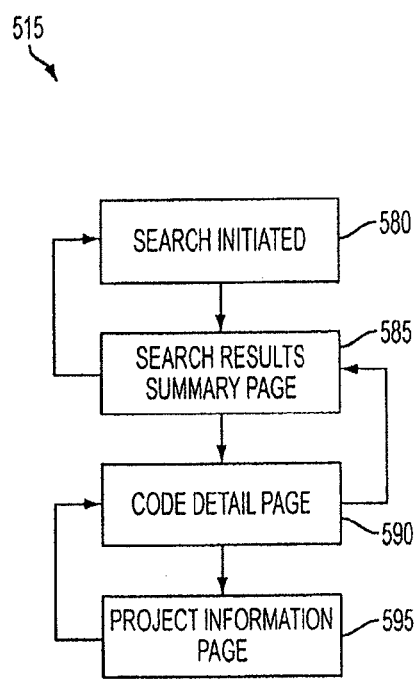
FIG. 5B: An embodiment of a process of requesting software code.

Alternatively, a search may be initiated by a user submission at a webpage or through a toolbar, for example. FIG. 5B illustrates a user-initiated search process. Process 515 includes search initiation, presenting a results summary page, providing detailed information, and returning to a project page.

Process 515 begins with initiation of a search at module 580. This may involve providing various search criteria, for example. At module 585, search results are provided responsive to the search criteria. Specific software code may be displayed at module 590. The user may also review project information (of the project from which the source came) at module 595, arid may find other code to integrate, for example.

Figure 6A:
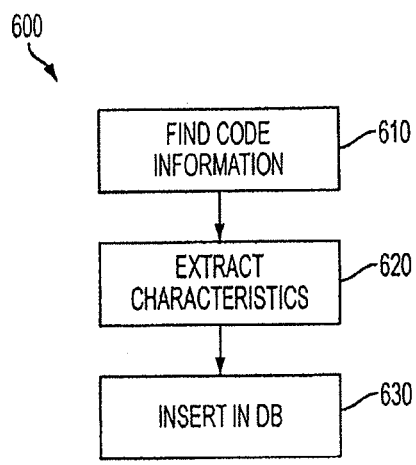
FIG. 6A: An embodiment of a process of obtaining software code.

Software code may be collected in a variety of ways. FIG. 6A provides an embodiment of a process of obtaining software code. Process 600 includes finding code information at module 610. This may include interfacing with a version control system or revision control system. This may also include code submissions made by developers, for example. For internal systems, specific version control systems may be used. For other systems, public sources of code can be used. Characteristics of the code are extracted at module 620, including information such as API, language, license, etc. This information is inserted into a database at module 630, to allow for rapid searching.

Figure 6B:
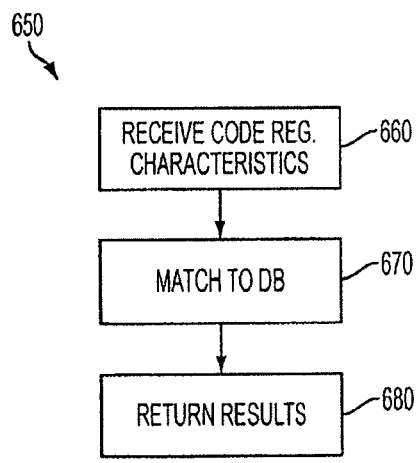
FIG. 6B: An embodiment of a process of searching a database of software code.

With information about software code collected, the software code may then be searched. FIG. 6B provides an embodiment of a process of searching a database of software code. Process 650 includes receiving code request characteristics, such as language, function, API, etc. at module 660. This further includes matching such characteristics to information in a database at module 670 (such as through database requests, for example). Results are then returned at module 680.

Figure 7:
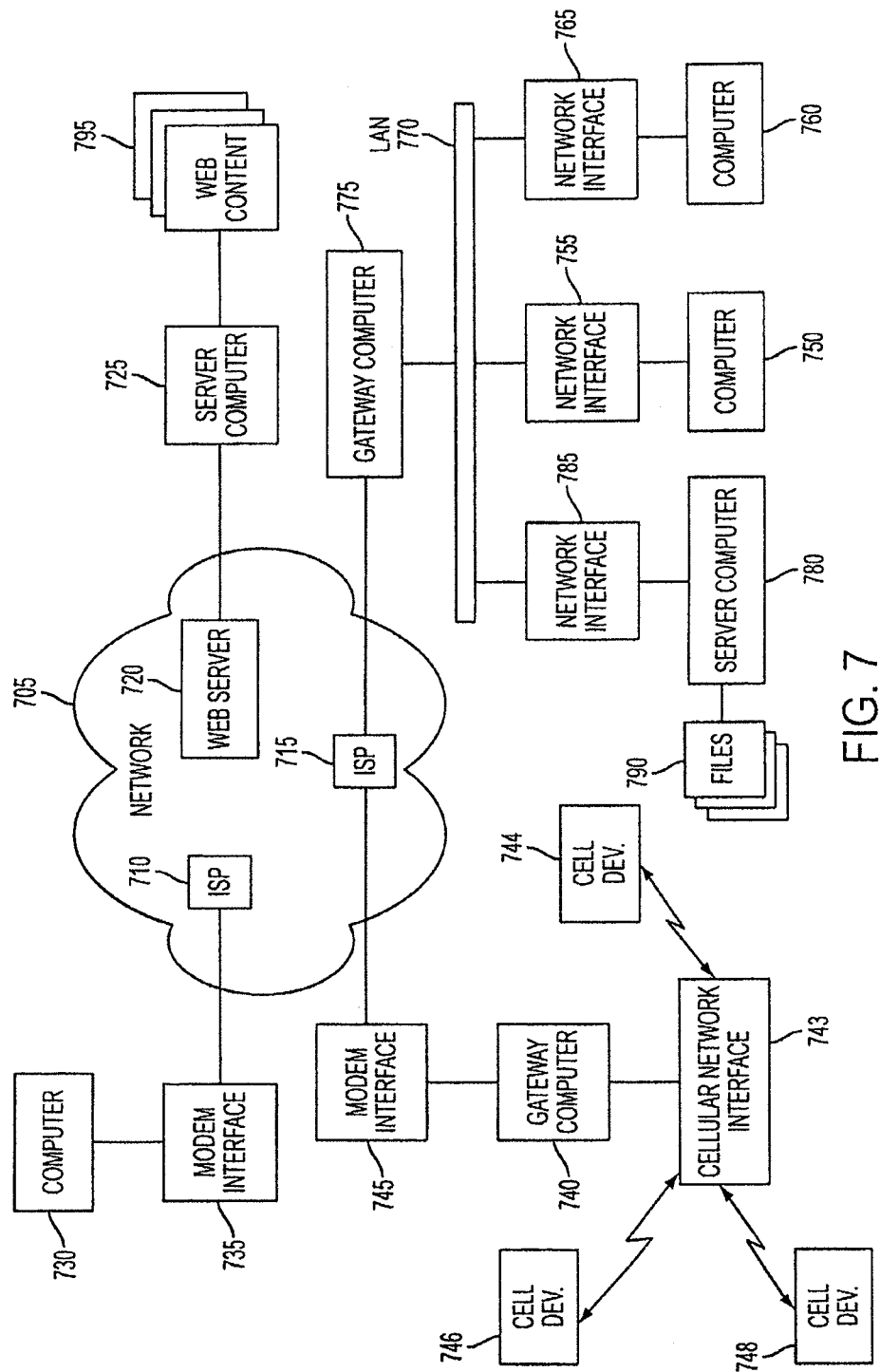
FIG. 7: An embodiment of a network which may be used with various other embodiments.
Figure 8:
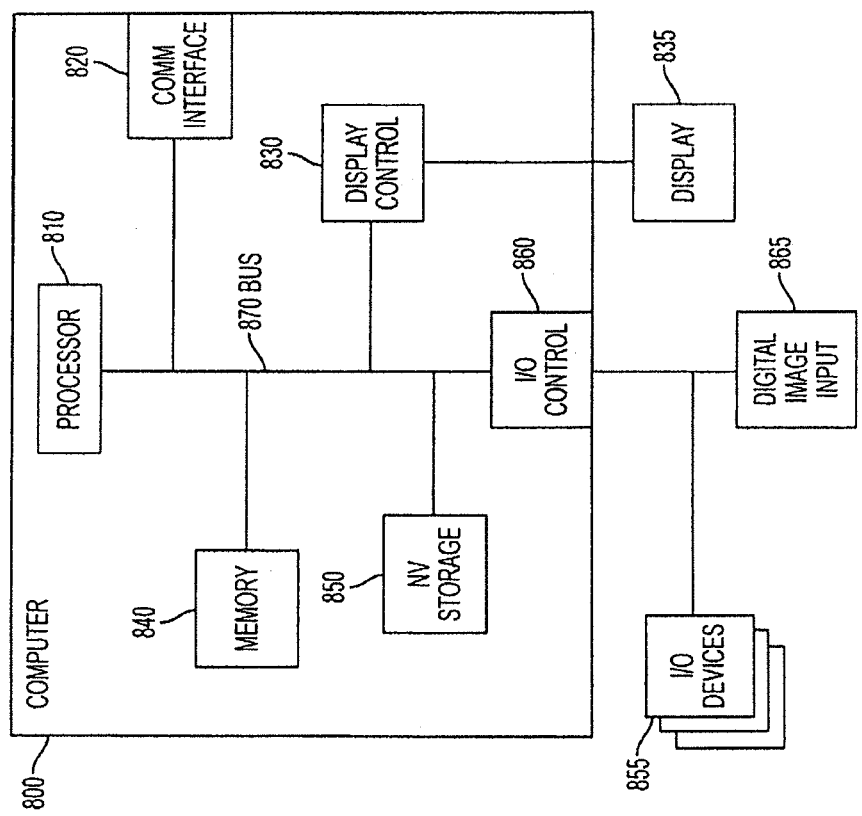
FIG. 8: An embodiment of a computer or machine which may be used with various other embodiments.

The following description of FIGS. 7-8 is intended to provide an overview of device hardware and other operating components suitable for performing the methods of the invention described above and hereafter, but is not intended to limit the applicable environments. Similarly, the hardware and other operating components may be suitable as part of the apparatuses described above. The invention can be practiced with other system configurations, including personal computers, multiprocessor systems, microprocessor-based or programmable consumer electronics, network PCs, minicomputers, mainframe computers, and the like. The invention can also be practiced in distributed computing environments where tasks are performed by remote processing devices that are linked through a communications network.

FIG. 7 shows several computer systems that are coupled together through a network 705, such as the internet, along with a cellular network and related cellular devices. The term "internet" as used herein refers to a network of networks which uses certain protocols, such as the tcp/ip protocol, and possibly other protocols such as the hypertext transfer protocol (HTTP) for hypertext markup language (HTML) documents that make up the world wide web (web). The physical connections of the internet and the protocols and communication procedures of the internet are well known to those of skill in the art.

Access to the internet 705 is typically provided by internet service providers (ISP), such as the ISPs 710 and 715. Users on client systems, such as client computer systems 730, 750, and 760 obtain access to the internet through the internet service providers, such as ISPs 710 and 715. Access to the internet allows users of the client computer systems to exchange information, receive and send e-mails, and view documents, such as documents which have been prepared in the HTML format. These documents are often provided by web servers, such as web server 720 which is considered to be "on" the internet. Often these web servers are provided by the ISPs, such as ISP 710, although a computer system can be set up and connected to the internet without that system also being an ISP.

The web server 720 is typically at least one computer system which operates as a server computer system and is configured to operate with the protocols of the world wide web and is coupled to the internet. Optionally, the web server 720 can be part of an ISP which provides access to the internet for client systems. The web server 720 is shown coupled to the server computer system 725 which itself is coupled to web content 795, which can be considered a form of a media database. While two computer systems 720 and 725 are shown in FIG. 7, the web server system 720 and the server computer system 725 can be one computer system having different software components providing the web server functionality and the server functionality provided by the server computer system 725 which will be described further below.

Cellular network interface 743 provides an interface between a cellular network and corresponding cellular devices 744, 746 and 748 on one side, and network 705 on the other side. Thus cellular devices 744, 746 and 748, which may be personal devices including cellular telephones, two-way pagers, personal digital assistants or other similar devices, may connect with network 705 and exchange information such as email, content, or HTTP-formatted data, for example. Cellular network interface 743 is coupled to computer 740, which communicates with network 705 through modem interface 745. Computer 740 may be a personal computer, server computer or the like, and serves as a gateway. Thus, computer 740 may be similar to client computers 750 and 760 or to gateway computer 775, for example. Software or content may then be uploaded or downloaded through the connection provided by interface 743, computer 740 and modem 745.

Client computer systems 730, 750, and 760 can each, with the appropriate web browsing software, view HTML pages provided by the web server 720. The ISP 710 provides internet connectivity to the client computer system 730 through the modem interface 735 which can be considered part of the client computer system 730. The client computer system can be a personal computer system, a network computer, a web tv system, or other such computer system.

Similarly, the ISP 715 provides internet connectivity for client systems 750 and 760, although as shown in FIG. 7, the connections are not the same as for more directly connected computer systems. Client computer systems 750 and 760 are part of a LAN coupled through a gateway computer 775. While FIG. 7 shows the interfaces 735 and 745 as generically as a "modem," each of these interfaces can be an analog modem, isdn modem, cable modem, satellite transmission interface (e.g. "direct PC"), or other interfaces for coupling a computer system to other computer systems.

Client computer systems 750 and 760 are coupled to a LAN 770 through network interfaces 755 and 765, which can be ethernet network or other network interfaces. The LAN 770 is also coupled to a gateway computer system 775 which can provide firewall and other internet related services for the local area network. This gateway computer system 775 is coupled to the ISP 715 to provide internet connectivity to the client computer systems 750 and 760. The gateway computer system 775 can be a conventional server computer system. Also, the web server system 720 can be a conventional server computer system.

Alternatively, a server computer system 780 can be directly coupled to the LAN 770 through a network interface 785 to provide files 790 and other services to the clients 750, 760, without the need to connect to the internet through the gateway system 775.

FIG. 8 shows one example of a personal device that can be used as a cellular telephone (744, 746 or 748) or similar personal device. Such a device can be used to perform many functions depending on implementation, such as telephone communications, two-way pager communications, personal organizing, or similar functions. The computer system 800 interfaces to external systems through the communications interface 820. In a cellular telephone, this interface is typically a radio interface for communication with a cellular network, and may also include some form of cabled interface for use with an immediately available personal computer. In a two-way pager, the communications interface 820 is typically a radio interface for communication with a data transmission network, but may similarly include a cabled or cradled interface as well. In a personal digital assistant, communications interface 820 typically includes a cradled or cabled interface, and may also include some form of radio interface such as a Bluetooth or 802.11 interface, or a cellular radio interface for example.

The computer system 800 includes a processor 810, which can be a conventional microprocessor such as an Intel pentium microprocessor or Motorola power PC microprocessor, a Texas Instruments digital signal processor, or some combination of the two types or processors. Memory 840 is coupled to the processor 810 by a bus 870. Memory 840 can be dynamic random access memory (dram) and can also include static ram (sram), or may include FLASH EEPROM, too. The bus 870 couples the processor 810 to the memory 840, also to non-volatile storage 850, to display controller 830, and to the input/output (I/O) controller 860. Note that the display controller 830 and I/O controller 860 may be integrated together, and the display may also provide input.

The display controller 830 controls in the conventional manner a display on a display device 835 which typically is a liquid crystal display (LCD) or similar flat-panel, small form factor display. The input/output devices 855 can include a keyboard, or stylus and touch-screen, and may sometimes be extended to include disk drives, printers, a scanner, and other input and output devices, including a mouse or other pointing device. The display controller 830 and the I/O controller 860 can be implemented with conventional well known technology. A digital image input device 865 can be a digital camera which is coupled to an i/o controller 860 in order to allow images from the digital camera to be input into the device 800.

The non-volatile storage 850 is often a FLASH memory or read-only memory, or some combination of the two. A magnetic hard disk, an optical disk, or another form of storage for large amounts of data may also be used in some embodiments, though the form factors for such devices typically preclude installation as a permanent component of the device 800. Rather, a mass storage device on another computer is typically used in conjunction with the more limited storage of the device 800. Some of this data is often written, by a direct memory access process, into memory 840 during execution of software in the device 800. One of skill in the art will immediately recognize that the terms "machine-readable medium" or "computer-readable medium" includes any type of storage device that is accessible by the processor 810 and also encompasses a carrier wave that encodes a data signal.

The device 800 is one example of many possible devices which have different architectures. For example, devices based on an Intel microprocessor often have multiple buses, one of which can be an input/output (I/O) bus for the peripherals and one that directly connects the processor 810 and the memory 840 (often referred to as a memory bus). The buses are connected together through bridge components that perform any necessary translation due to differing bus protocols.

In addition, the device 800 is controlled by operating system software which includes a file management system, such as a disk operating system, which is part of the operating system software. One example of an operating system software with its associated file management system software is the family of operating systems known as Windows CE® from Microsoft Corporation of Redmond, Wash., and their associated file management systems. Another example of an operating system software with its associated file management system software is the Palm® operating system and its associated file management system. The file management system is typically stored in the non-volatile storage 850 and causes the processor 810 to execute the various acts required by the operating system to input and output data and to store data in memory, including storing files on the non-volatile storage 850. Other operating systems may be provided by makers of devices, and those operating systems typically will have device-specific features which are not part of similar operating systems on similar devices. Similarly, WinCE® or Palm® operating systems may be adapted to specific devices for specific device capabilities.

Device 800 may be integrated onto a single chip or set of chips in some embodiments, and typically is fitted into a small form factor for use as a personal device. Thus, it is not uncommon for a processor, bus, onboard memory, and display-i/o controllers to all be integrated onto a single chip. Alternatively, functions may be split into several chips with point-to-point interconnection, causing the bus to be logically apparent but not physically obvious from inspection of either the actual device or related schematics.

Some portions of the detailed description are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention, in some embodiments, also relates to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-roms, and magnetic-optical disks, read-only memories (ROMs), random access memories (RAMs), EPROMs, EEPROMs, magnetic or optical cards, or any type of media suitable for storing electronic instructions, and each coupled to a computer system bus.

The algorithms and displays presented herein are not inherently related to any particular computer or other apparatus.

Various general purpose systems may be used with programs in accordance with the teachings herein, or it may prove convenient to construct more specialized apparatus to perform the required method steps. The required structure for a variety of these systems will appear from the description below. In addition, the present invention is not described with reference to any particular programming language, and various embodiments may thus be implemented using a variety of programming languages.

Figure 9:
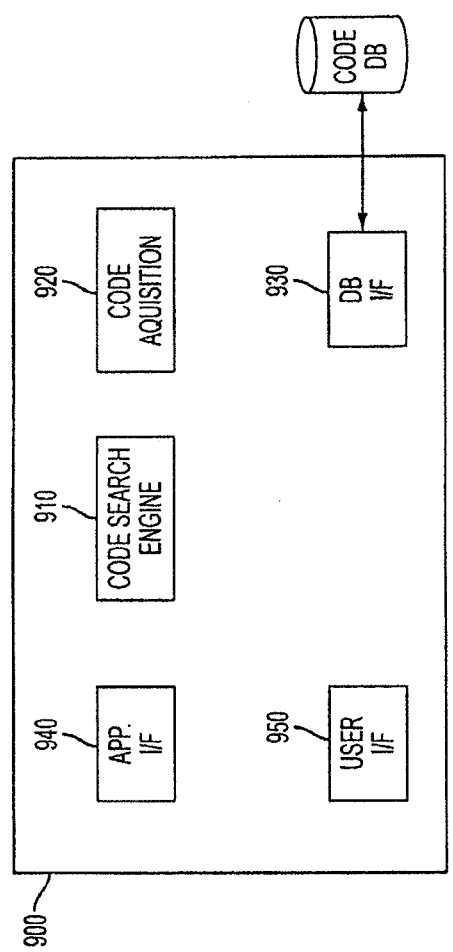
FIG. 9: An embodiment of a medium which may be used in conjunction with an application, for example.
Figure 10:
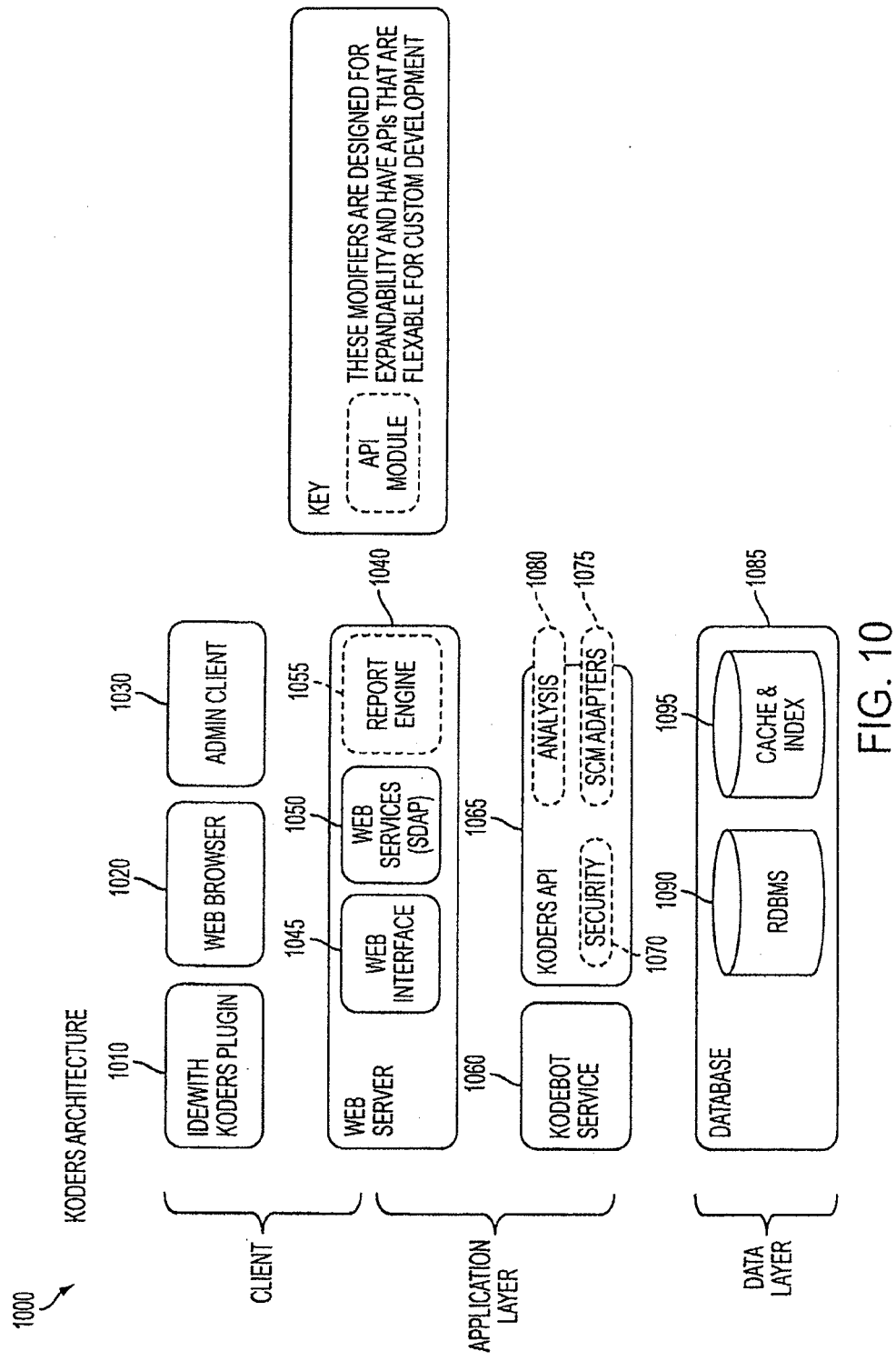
FIG. 10: An alternate embodiment of a machine-readable medium is provided.

The search engine and application interface may be embodied in a medium in some embodiments. FIG. 9 illustrates an embodiment of a medium which may be used in conjunction with an application, for example. Medium 900 includes a code search engine, code acquisition module, database interface, user interface and application interface. Code search engine 910 may interact with the user interfaces and the database interface to facilitate searching for software code. Acquisition module 920 may interface with code sources such as revision control systems, and accept code submissions. Database interface 930 may accept database entries and requests for information from a database 960. Application interface 940 may work with an application to allow search requests to search engine 910, such as by providing a plug-in, toolbar, or other interface. User interface 950 may similarly allow for search requests or code submission through the web (separate from an IDE).

Another embodiment of a machine-readable medium may be used to implement the methods and systems of various embodiments. A source code search system as embodied in medium 1000 may be implemented as three primary layers, each potentially containing several components. These components may include a source code database index (index), a source code crawler (kodebot), a web application front-end (web interface), and desktop client plugins (plugins).

The index may contain two primary schemas—a registry of repositories and projects—essentially a map of internal source code databases, as well as a high-performance searchable source code cache (implemented as cache 1095 in this embodiment). The project registry, system statistics and other metadata may be maintained in an SQL Server (a relational database 1090) for example. Database 1085 thus includes the database 1090 and search portions 1095. Alternate databases options are also available.

The kodebot 1060 may be implemented as a service process which synchronizes the index with external version control systems (or software configuration management systems (SCMs) for example) within an organization, for example. Koders API 1065 may allow for interaction with other software services and data repositories, for example. Thus, SCM adapter 1075 may allow for an interface with SCMs, analyzers 1080 may be customized to extract signature information from software code, and security API 1070 may be used to program security measures for the system 1000. The web server 1045 may allow users to search the index 1095, view related reports, and update the project registry, for example. This may occur in part through use of web interface 1045, web services 1050, and report engine 1055, for example.

The admin client 1030 (sometimes referred to as the kodebot client) may serve as the administrative interface for maintenance of system configuration, security policy, and the project registry, for example. The plugins 1010 may be optional components of the system that allow developers to search a code server and database within the context of a development environment, for example. Currently, plugins may be used with popular applications such as Visual Studio .NET, Eclipse and Firefox, for example. Developers can potentially download and install these components at any time. Web browser 1020 may be a conventional web browser such as Internet Explorer or Firefox, for example.

In various embodiments, methods and apparatus may be provided, and a further discussion of various features in some embodiments may be illustrative. An embodiment may include a method of notifying software developers of existing reusable source code from external databases which may be integrated into their current project. Similarly, an embodiment may include a method of integrating a software component with a text-editor or integrated development environment (IDE).

Additionally, embodiments may include a method for detecting each time a developer is creating or modifying structural elements of a source code file from within a text editor (IDE). This method may include integrating with the IDE using available APIs and methods to capture developer keyboard sequences and IDE-specific events. The method may further include detecting the programming language the developer is writing source code in either by analysis of the file, or via API methods provided by the IDE. The method may also include detecting the creation or modification of classes, interfaces, functions, methods, properties or fields by analyzing keyboard sequences for syntax used to define such elements as specified by the grammar of the particular programming language. The method may include extracting the element name and related signature information if available.

Moreover, embodiments may include a method of constructing a search query from the programming language and element name extracted. The method may involve signature information of the defining element as a search parameter. The method may further include specifying the breadth of desired results the developer would like to receive. Such specification may include 'exact matches', 'better matches', or 'more matches' for example.

In issuing a search query to one or more external source code databases, the search mechanism may be implemented to avoid interrupting or distracting the user while the search is being issued and a response returned. Similarly, the search mechanism may provide a response containing the number of matching results and textual indication of the nature of those results. Likewise, the method can be issued (a search can be issued) to remotely located source code databases connected to the computer using a protocol. For example, the method may use HTTP/SOAP for the network protocol Additionally, embodiments may implement a method of notifying the developer through visual or other means the number and nature of matching results. This may include an audible notification. Such a notification need not require the developer to stop typing, or otherwise disrupt their work. Moreover, the method may involve hiding the visual notification if the user does not activate the link after a fixed or predetermined number of seconds. The developer may easily access search results, such as by allowing the developer to click the message to view the results or allowing the developer to type a specific keyboard combination to view the results.

Embodiments may further include a method of presenting the results in such a way that they may be easily copy-and-pasted from the results into the developers IDE. For example, this method may include opening a new web browser window within the IDE. The method may also include constructing a URL which contains the database location and search criteria. The method may further include passing the URL to the newly opened web browser window. The method may also include displaying the resulting results in the web browser window. The method may allow the developer to navigate as needed. Likewise, the method may allow the developer to copy source code off of pages displayed in the web browser window.

Embodiments of methods may further incorporate user preferences to improve search accuracy. This may involve allowing a user to create a list of certain terms which will not be searched. Similarly, the method may be implemented to remember each search conducted and not re-issue repeat searches during the time the IDE is active Likewise, embodiments may include a method of indexing source code so that it may be searched quickly. The method may include a method of (or protocol for) specifying the location of source code projects. The method may also involve a method of retrieving and analyzing source code. The method may also include a method of compiling source code into searchable indexes. Likewise, the method may include a method of exposing a search interface to remote clients over the network that utilizes protocols such as HTTP/SOAP.

Along with the various processes of retrieving source code, embodiments may include a method of recording statistics. This may involve recording each search, recording when a developer chooses to download a source code file, and a method of recording when a user copies source code from a web page, for example. The method of recording copying of source code may involve embedding special code in the web page to detect mouse events, detecting when a user starts to copy by clicking and holding a mouse button down, detecting when the user has released the mouse button, and sending a message to the server indicating that a copy and paste event has occurred. Recording statistics may also involve recording a correlation between a search and the result(s) that was downloaded or copied by the developer.

With statistics recorded, embodiments may implement a method of applying statistics to improve search results over time. This method may include assigning search results files a score. The method may further include increasing the default score for files based on how frequently they are downloaded or copied by developers. Also, the method may involve further increasing the score for a particular file when it has been shown to be downloaded or copied more than once by developers issuing the same search. Likewise, the method may include sorting search results so that matching resultant files shown in order of score, highest score first, and lowest scare last.

Figure 11:
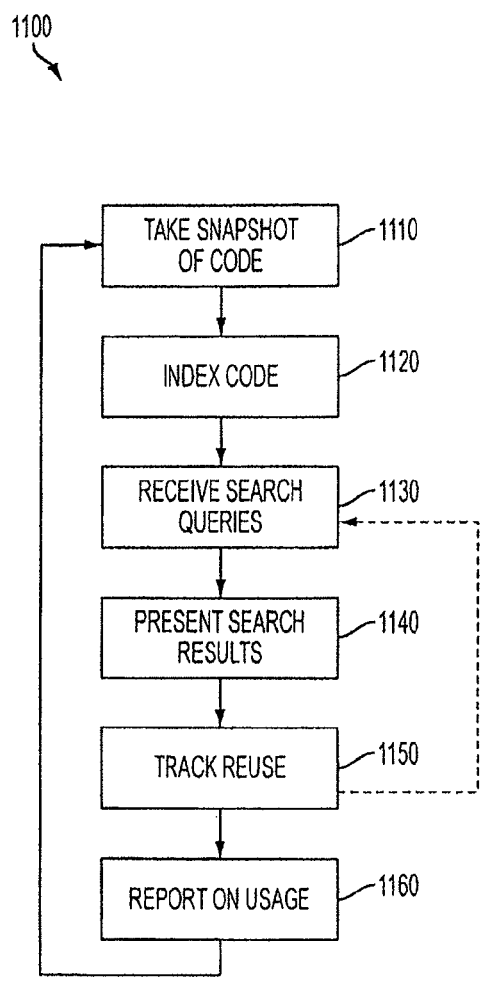
FIG. 11: An embodiment of a process of operating a code search engine.

Further illustration of an embodiment in a standalone or web-based form may be useful. Note that whether an embodiment is implemented as a standalone application, web-based application, or as part of a development environment or application, functionality from the various embodiments may be used. FIG. 11 illustrates an embodiment of a process of operating a code search engine. Process 1100 includes taking a snapshot of source code, indexing the source code, receiving search requests, presenting search results, tracking reuse of code, and reporting on usage of code.

Process 1100 initiates with a snapshot of source code at module 1110. This may involve retrieving code from a revision control system, a public software code repository, or some combination of the two. The snapshot of source code is indexed at module 1120, providing for high-speed search and location of source code portions.

At module 1130, a request or query for source code is received. At module 1140, the index of source code is searched and results are presented. In conjunction with presentation of results, reuse of code is tracked at module 1150, such as by accumulating the number of times source code portions are indexed in results, or are actually used by a user. At module 1160, utilization and reuse are reported to a user or administrator.

Note that the process may involve loops of various modules. For example, repeated queries and results may involve a loop of modules 1130, 1140 and 1150. Likewise, after a report on usage, or even before such a report, the process may loop back to module 1110 for an updated snapshot of source code.

Figure 12:
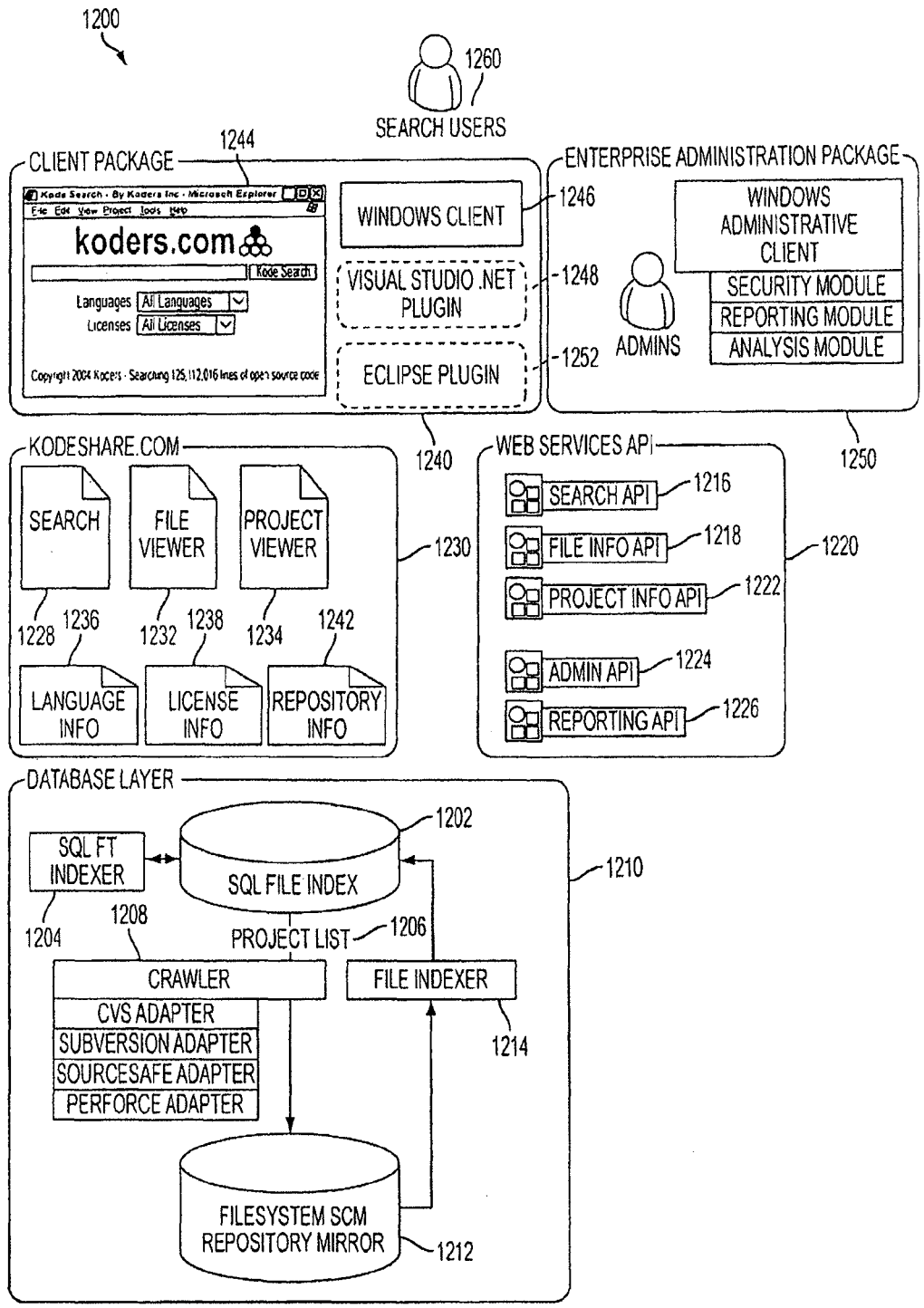
FIG. 12: An embodiment of a code search engine system.

Various embodiments of a source code search system may implement the method of FIG. 11 or a similar method. FIG. 12 illustrates an embodiment of a code search engine system. System 1200 includes a database layer, web services API, client interface, administrator interface, and a website engine.

Database layer 1210 includes a SQL index 1202, indexer 1204, project list 1206 (a list of software projects in the repository), crawler 1208 (a software robot which can find data remotely), repository 1212 and repository indexer 1214. Index 1202 and repository 1212 provide the main sources of data for the system, with the index 1202 providing a fast access system and repository 1212 providing comprehensive data.

Website engine 1230 provides an overall system for finding and displaying source code. Search engine 1228 provides search functions. File viewer 1232 provides a user interface to display source code. Project viewer 1234 provides a user interface to view a project in which source code may be found. Language information 1236, license information 1238 and repository info nation 1242 provide translation of language (Java, C, etc.), license data and repository code respectively.

Web API 1220 provides a web-based interface for access to website engine 1230. Search API 1216 provides a search interface. File and project information APIs 1218 and 1222 provide interfaces for information on specific files and related projects. Administrative API 1224 provides an interface for command access and maintenance. Reporting API 1226 provides an interface for report information, such as searches performed and code used/reused.

Client interface 1240 provides a client which can be used as a plug-in or a standalone application. User interface 1244 is a web-based interface. Windows client 1246 allows for use within a Windows operating system. Visual Studio plugin 1248 provides a plugin for Visual Studio development environments or similar development platforms. Eclipse plugin 1252 provides a similar interface for an Eclipse environment. Moreover, similar plugins may be used with other systems.

For administrative access, administrative interface 1250 is provided. This interface allows for access by someone with administrative privileges. Reporting of performance results may be provided through interface 1250, along with security reporting and analysis of performance, for example. Users 1260 may be expected to use client 1240, but qualified users may use administrative interface 1250.

Figure 13:
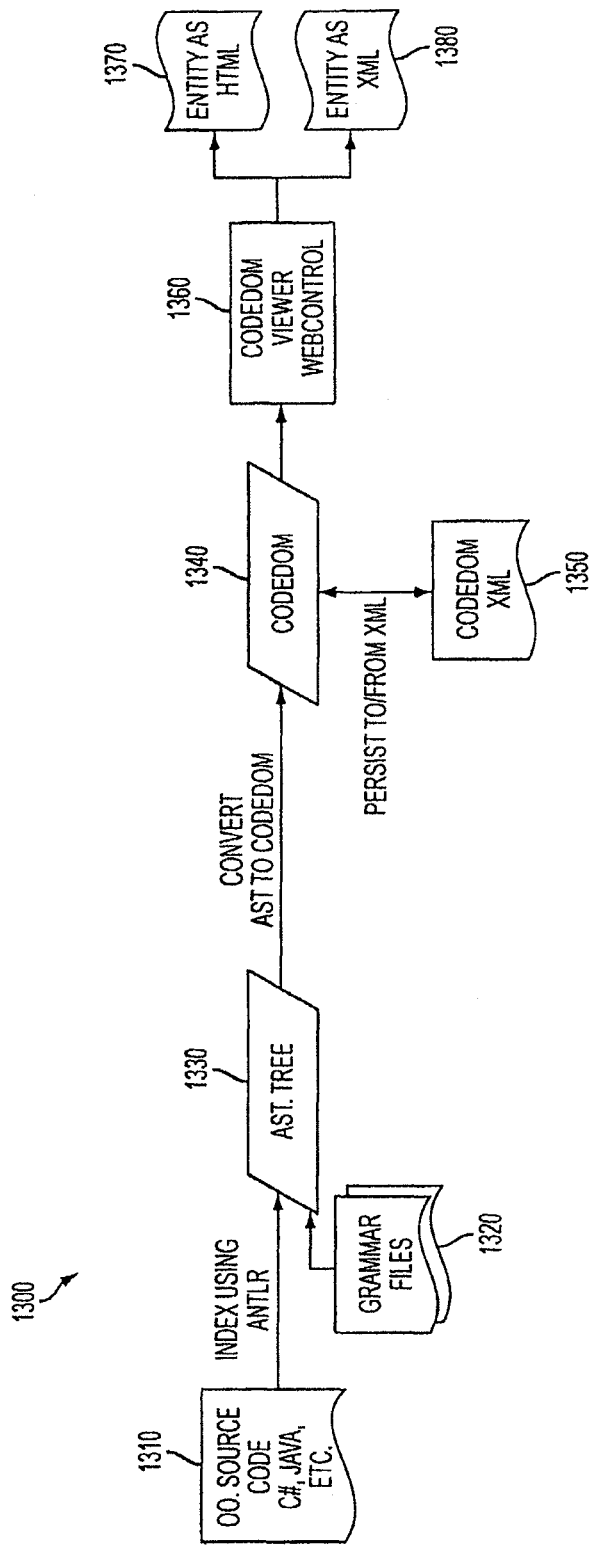
FIG. 13: Another embodiment of a code search engine system.

An alternative representation may also help illustrate the process. FIG. 13 illustrates another embodiment of a code search engine system. System 1300 provides a path for data through a system for a code search engine.

Source code 1310 is indexed, based on grammar files 1320 to form an AST tree 1330. AST tree 1330 is an abstract syntax tree, with internal nodes as operators and leaf nodes as operands. AST tree 1330 can be mapped to a code domain 1340, a representation of the source code which is presentable to users. Code domain XML file 1350 provides a format for code domain 1340. Viewer 1360 provides an interface to code domain 1340, allowing for export of data as HTML data 1370 or XML data 1380, for example.

With the various available representations of code, searches at various levels of abstraction may be accomplished. Thus, full text searching may occur. Syntactical analysis of code may be done, such that code with identical syntactical structure may be identified. Meta-data extraction may also be used, thereby allowing searching meta-data surrounding code for similar attributes.

Figure 14:
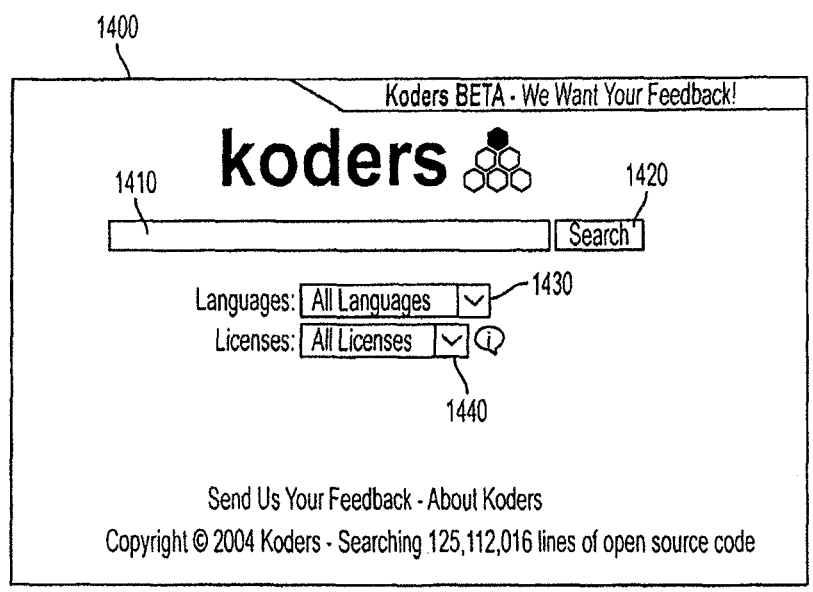
FIG. 14: An embodiment of a code search user interface.

Various user interfaces may be used with implementations of code search engines. FIG. 14 illustrates an embodiment of a code search user interface. Interface 1400 provides a basic search interface which may be used as a website. Search box 1410 allows for entry of query criteria. Search button 1420 activates a search. Language selector 1430 allows for selection of a source code language. License selector 1440 allows for selection of a specific license, such as the GPL license, for example.

Figure 15:
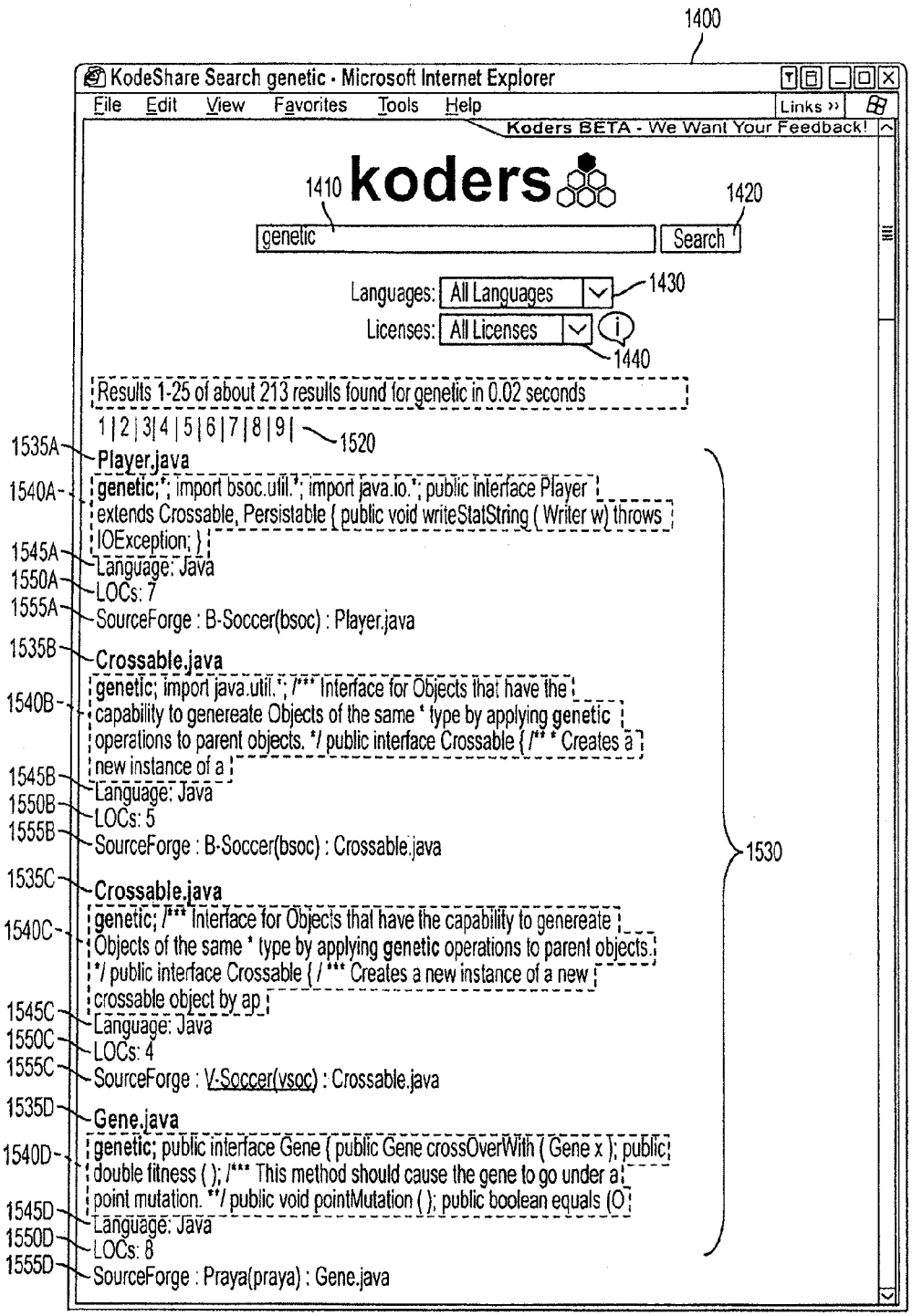
FIG. 15: The embodiment of FIG. 14 showing search results.

After a search, results are presented. FIG. 15 illustrates the embodiment of FIG. 14 showing search results. Results 1530 include a title 1535, API 1540, language 1545, lines of code 1550 and project source 1555 for each search result.

Figure 16:
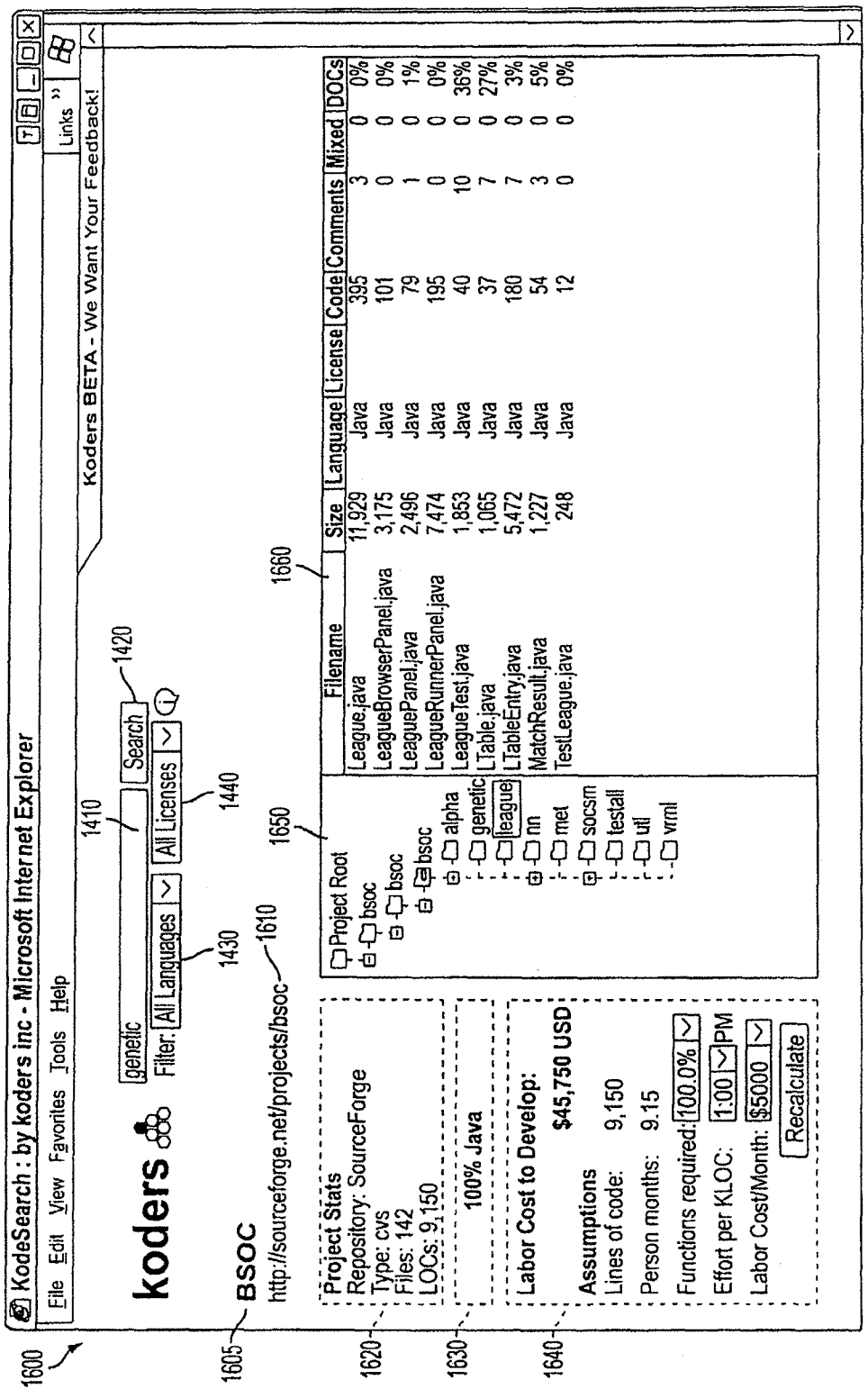
FIG. 16: An embodiment of a user interface for a code portion.

A project may also be accessed, either as part of a search result or as a development project. FIG. 16 illustrates an embodiment of a user interface for a code portion. User interface 1600 provides a title of a code portion 1605, website 1610, project status 1620, project type 1630, development cost 1640, project directory structure 1650 and project code portions listing 1660.

Features and aspects of various embodiments may be integrated into other embodiments, and embodiments illustrated in this document may be implemented without all of the features or aspects illustrated or described. One skilled in the art will appreciate that although specific examples and embodiments of the system and methods have been described for purposes of illustration, various modifications can be made. For example, embodiments of the present invention may be applied to many different types of databases, systems and application programs. Moreover, features of one embodiment may be incorporated into other embodiments, even where those features are not described together in a single embodiment within the present document. Accordingly, the invention is described by the appended claims.

We claim:

1. A computer implemented method, comprising:
receiving a search query for a programming code search engine;
searching a programming code database with the search query in a form of a search criterion that conforms to an underlying storage of textual keywords and metadata,
the programming code database being populated with programming code from one or more repositories of programming code,
the programming code in the programming code database being indexed by use of a full-text analysis of the programming code, the full-text analysis including:
a plain-text analysis that evaluates the programming code as plain text to extract a set of plain text keywords found in the programming code; and
a plain text-based statistical analysis that derives statistical metadata from the set of plain text keywords;
scoring results of the searching according to a scoring criterion, the scoring criterion including a reuse score that tracks a copying for reuse of lines of programming instructions in the programming code database; and
presenting the results of the searching in a ranked order according to the scoring, the results being a subset of the programming code corresponding to the search query.

2. The method of claim 1, further comprising:
indexing the programming code of the programming code database; and
wherein searching includes comparing the search query to an index of the programming code database.

3. The method of claim 1, further comprising:
reporting on usage of the lines of programming instructions of the programming code database.

4. The method of claim 1, wherein:
searching includes searching for a full text match.

5. The method of claim 1, wherein:
searching the programming code database includes searching for matching metadata associated with the programming code, wherein the matching metadata associated with the programming code includes: (i) internal metadata that is located internal to the programming code in the database, or (ii) external metadata that is located external to the programming code, or (iii) combination metadata that is located both internal and external to the programming code.

6. The method of claim 1, wherein presenting the results of the searching includes presenting the results in an order based on reuse statistics associated with the results.

7. The method of claim 6, further comprising:
reporting on reuse of lines of programming code of the programming code database.

8. A method of operating a software search engine, comprising:
populating a programming code database, wherein programming code in the programming code database is indexed by use of a full-text analysis of the programming code, the full-text analysis including:
a plain-text analysis that evaluates the programming code as plain text to extract a set of plain text keywords found in the programming code; and
a plain text-based statistical analysis that derives statistical metadata from the set of plain text keywords;
receiving a search query for a programming code search engine;
searching the programming code database resulting from the full-text analysis with the search query in the form of a search criterion that conforms to an underlying storage of textual keywords and metadata, the metadata including the statistical metadata derived from a statistical analysis component of the full-text analysis, wherein the search query includes a search parameter;
presenting results of the searching, wherein the results are a subset of the programming code corresponding to the search parameter;
tracking reuse of lines of programming instructions of the programming code of the programming code database, the reuse being a copying instance of a line of programming instructions of the programming code; and
reporting on usage of the lines of programming instructions.

9. A computer system, comprising:
a processor;
a programming code database storing programming code files that are indexed by use of a full-text analysis of the programming code files, the full-text analysis including:
a plain-text analysis that evaluates the programming code files as plain text to extract a set of plain text keywords found in the programming code files; and
a plain text-based statistical analysis that derives statistical metadata from the set of plain text keywords;
an indexing engine executing in the processor for generating a text based index;

a search engine executing in the processor and coupled to the programming code database and with the indexing engine and the text based index, the search engine searching for a subset of programming code files that have indexes based on a matching relationship with a textual keyword in a search query in the form of a search criterion that conforms to an underlying storage of text words and metadata;

scoring means for scoring results of the matching relationship found from the searching, between the text based index and the search query, according to a scoring criterion, the scoring criterion including a reuse score that tracks a copying for reuse of a line of programming instructions of each programming code file in the programming code database; and a user interface coupled to the search engine, the user interface receiving the search query and presenting the subset of programming code files in a ranked order according to the scoring in response to the search query.

10. The system of claim 9, wherein:
the programming code database is populated with the programming code files from a public repository of programming code files.

11. The system of claim 9, wherein:
the user interface is part of a programming code development application; and
the user interface provides means for performing the searching and for at the user's option both downloading an entire programming code file and copying and pasting any line of programming instructions of the programming code file into a code file being developed so that the programming code file identified in the searching can readily be inserted into the code file being developed.

12. A computer program stored on a tangible computer readable storage media and including computer program code software for implementing a method including:
receiving a search query for a programming code search engine;
searching a programming code database with the search query in the form of a search criterion that conforms to an underlying storage of textual keywords and metadata that was located outside and external from programming code associated with the programming code database, the programming code database being populated with the programming code from one or more repositories of programming code, the programming code in the programming code database being indexed by use of a full-text analysis of the programming code, the full-text analysis including:
a plain-text analysis that evaluates the programming code as plain text to extract a set of plain text keywords found in the programming code; and
a plain text-based statistical analysis that derives statistical metadata from the set of plain text keywords;
scoring results of the searching according to a scoring criterion, the scoring criterion including a reuse score that tracks a copying for reuse of a line of programming instructions of the programming code in the programming code database; and
presenting the results of the searching in a ranked order according to the scoring, the results including a subset of the programming code corresponding to the search query.

13. A computer program stored on a tangible computer readable storage media and including computer program code software for implementing a method of operating a software search engine including:
populating a programming code database with source programming code, the programming code in the programming code database being indexed by use of a full-text analysis of the programming code, the full-text analysis including:
a plain-text analysis that evaluates the programming code as plain text to extract a set of plain text keywords found in the programming code; and
a plain text-based statistical analysis that derives statistical metadata from the set of plain text keywords;
receiving a search query for a programming code search engine;
searching the programming code database with the search query in the form of a search criterion that conforms to an underlying storage of textual keywords and metadata that was located outside and external from the programming code, the search query including at least one textual search parameter;
scoring results of the searching according to a scoring criterion;
presenting the results of the searching in a ranked order according to the scoring, the results being a subset of the programming code matching the at least one textual search parameter;
tracking reuse of lines of programming instructions of the programming code of the programming code database, the reuse being a copying instance of a line of programming instructions of the programming code; and
reporting on usage of the lines of programming instructions.

14. The method of claim 1, further comprising:
detecting a change in a programming code development environment, the change being detected at a time a code developer makes at least one code change during a code development or programming activity;
generating the search query based on a keyword in the change; and
reusing the subset of the programming code in the programming code development environment.

15. The method of claim 1, wherein:
the programming code in the programming code database is further indexed based on at least one of: a corresponding frequency for each of the set of keywords found in each piece of the programming code, and a number of times each piece of the programming code has been reused; and
the results are ordered based on a number of times each piece of the subset of programming code has been reused.

16. The computer system of claim 9, further comprising:
a programming code indexer coupled with the programming code database, the programming code indexer parsing the plain text keywords from the programming code file stored in the programming code database and indexing the programming code file based on the plain text keywords.

17. The computer system of claim 9, further comprising:
a programming code crawler coupled with the programming code database, the programming code crawler locating new programming code files from external sources and storing the new programming code files to the programming code database.

18. The computer system of claim 9, further comprising:
a web service provider coupled with the search engine, the web service provider exposing web application programming interfaces (APIs) of the search engine to the user interface.

19. The computer program of claim 12, wherein the method further including:
detecting a change in a programming code development environment;
generating the search query based on a keyword in the change; and
reusing the subset of the programming code in the software programming code development environment.

20. The method of claim 1, wherein the search query further includes metadata based search query parameters, and the metadata based search query parameter include metadata parameters that are external to the programming code being searched.

21. The method of claim 20, wherein the metadata based search query parameters include external license meta data associated with the code.

22. The method of claim 1, wherein the search query further includes a language specific search query component for parsing of the programming code to extract and store certain meta data and statistics as additional search query criteria and to aid a scoring and ranking of the results of the searching.

23. The method of claim 1, wherein only a full text index and any optionally extracted meta data are stored, and no parse trees if transiently created are stored.

24. The method of claim 1, wherein search results are based on a result of text index and meta data matching and not based on matching parse trees.

25. The method of claim 1, wherein the results of the searching are not based on comparing structure of the search criterion with parse tree structures in a searched storage; and the searching is not based solely on actual programming code but also based on finding matches based on the metadata.

26. The computer system of claim 9, wherein the search query further includes meta data based search query parameters.

27. The computer system of claim 26, wherein the meta data based search query parameters include license meta data associated with the code.

28. The computer system of claim 9, wherein the search query further includes a syntax-aware plain-text based search query component.

29. The computer system of claim 9, wherein the search query further includes a syntax-aware plain-text based search query component that is based on grammatical rules.

30. The computer system of claim 9, wherein the search query further includes a language specific search query component for parsing of the programming code to extract and store certain meta data and statistics as addition search query criteria and to aid a ranking of search result.

31. The computer system of claim 9, wherein only the text based index and any optionally extracted meta data are stored, and no parse trees if transiently created are stored.

32. The computer system of claim 9, wherein search results are based on the result of text index and meta data matching and not based on matching parse trees.

33. The computer system of claim 9, wherein results of the searching are not based on comparing structure of the search criterion with parse tree structures in a searched storage; and the search is not based solely on actual programming code but also based on finding matches based on the meta data.

34. The method of claim 1, further comprising indexing the programming code to generate an index.

35. The method of claim 34, wherein the index contains the set of plain text keywords found in the programming code and a corresponding count of a frequency of each keyword in the programming code.

36. The method of claim 34, wherein the index is generated by parsing the programming code using a regular expression system to find matches of each word using a pattern matching expression that is specific to the syntax of the particular programming language used in the programming code; and
the index generation includes parsing the programming code using a regular expression system to find matches of each word using a pattern matching expression that is specific to the syntax of the particular programming language used in the programming code, and where a table of words and their frequency in the programming code is generated and maintained by adding each new word found to the table with a frequency count of 1 and incrementing the frequency count in the table for each additional time the word is found in contents of the programming code.

37. The method of claim 34, wherein the indexing further generates and maintains a table of words and their frequency in the programming code, adding each new word found to the table of words with a frequency count of 1, and incrementing the frequency count in the table for each additional time the word is found in the contents of the programming code.

38. The method of claim 34, wherein the index contains statistical metadata comprising in combination:
total number of lines of text in the programming code;
total number of lines containing the programming instructions in the programming code;
total number of lines containing comments in the programming code;
total number of lines containing both the programming instructions and the comments; and
the total number of lines that are empty or blank in the programming code.

39. The method of claim 1, wherein the metadata comprises program language and program license information.

40. The method of claim 1, wherein the metadata comprises:
programming language(s) for the programming code;
number of lines of the programming instructions, comments, mixed programming instructions and comments, and blank lines in the programming code;
length of the programming instructions;
length of the comments;
embedded licenses;
keywords used in the programming code; and
the frequency of the keywords used in the programming code.

41. The method of claim 40, wherein each of the statistical information are determined by parsing the programming code using a regular expression pattern matching system which matches patterns specific to the programming language found in the programming code; and
the index generation includes parsing the programming code using a regular expression system to find matches of each word using a pattern matching expression that is specific to the syntax of the particular programming language used in the programming code, and where a maintaining a table of words and their frequency in the programming code is generated and maintained by adding each new word found to the table with a frequency count of 1 and incrementing the frequency count in the table for each additional time the word is found in contents of the programming code.

42. The method of claim 41, wherein the patterns are determined for each programming language by the syntax specification for the programming language using a full-text based custom indexing process for each type of programming code.

43. A computer implemented method, comprising:
receiving a search query for a programming code;
indexing, using a processor, a programming code database comprising a plurality of programming code files to generate an index, the programming code files in the programming code database being indexed by use of a full-text analysis of the programming code files, the full-text analysis including:
a plain-text analysis that evaluates the programming code files as plain text to extract a set of plain text keywords found in the programming code files; and
a plain text-based statistical analysis that derives statistical metadata from the set of plain text keywords;
the index containing a list of text keywords found in each programming code file with a corresponding statistical count of a frequency of occurrence of each keyword in the file generated by the plain text-based statistical analysis;
the index being generated by parsing each programming code file using a regular text expression to find matches of each textual keyword using a text pattern matching expression that is specific to a syntax of a particular programming language used in the programming code file;
the indexing generating and maintaining a table of text words and the frequency of each of the text words in the programming code file;
searching the programming code database comprising the plurality of programming code files using the index and a search criterion, the search criterion being based on the table of text words and metadata; and
presenting results of the searching according to a scoring of the results, the scoring being based on a scoring criterion that includes a reuse score that tracks a copying for reuse of a line of programming instructions of each programming code file in the programming code database.

44. The method of claim 1, further comprising:
after conducting a search, generating and presenting summaries of the programming code that match the search query;
generating and displaying a file contents in a code-colored fashion and highlighting the search terms from the search query;
generating a user clickable code view display interface that presents a user with an option for clicking a link to a particular programming code from the search results list from the list of search results; and
receiving an input via a click or select indication to the link to the particular programming code so that at the user's option, an entirety of the particular programming code or any line of programming instructions of the particular programming code is downloaded or the user may copy and paste the file or lines of programming instructions of the particular programming code into an application in their current programming environment.

45. The method of claim 44, further comprising:
when the particular programming code is downloaded, the system registers download as an instance of reuse and correlates the reuse with the previous search;
when a line of programming instructions of the particular programming code is selected in order to cut and paste, the system detects selection and presents the user with a dialog box for either confirming that they wish to copy the line of programming instructions of the particular programming code or to cancel copying, and
where: (1) canceling the copying will disable a copy and paste function; (2) confirming the operation will enable the copy and paste function and register an instance of reuse on the system and correlating the reuse to the search conducted.

46. The method of claim 1, wherein the method further comprises:
indexing the programming code to generate an index;
the index including keywords found based on the text in the programming code with a corresponding count of the frequency of each keyword in the programming code, and the indexing generated by parsing the programming code using a regular expression process including a pattern matching expression process that is specific to the syntax of the particular programming language used in the programming code; and
the searching including comparing the search query with the generated index to produce the syntax aware textual search result.

47. The method of claim 1, further comprising:
keeping a reference count for each entity;
summing these reference counts at individual programming code level; and
using the reference counts at the individual programming code level when generating a scoring result that includes an indication of which the programming code are likely more reusable matches than other programming code.

48. The method of claim 47, further comprising:
using a formula to calculate a score for each programming code matching a search wherein the score is used to sort the display of resulting programming code from the search query to an end user; and
displaying the programming code that score higher with a higher ranking if: (1) the programming code have been reused by developers previously, (2) the programming code contain a definition for an entity which is referenced by other projects, and/or (3) the programming code have a high frequency of matching terms specified in the search.

49. The method of claim 48, wherein:
the matching terms are selected from the set consisting of:
a reuse score that indicates the number of times a file has been downloaded or a line of programming instruction of the file has been copied;
a referenced entity count that indicates the number of references to the entities in the file from other files within the project and within an entire index;
a word frequency count that indicates the number of times a search term is found divided by the number of words in the file multiplied by 100;
a score that is defined by a mathematical expression that generates a score based on reuse count, referenced entity count, and word frequency count; and
the use of this process ensures that files that have been reused are displayed first, followed by files that have many external references to the entities defined within are listed later, followed by files that have a high frequency of the search terms contained within the content.

50. The method in claim 1, wherein: the metadata comprises the metadata that was located outside and external from the programming code.

51. The computer system in claim 9, wherein: the metadata comprises the metadata that was located outside and external from the programming code files themselves.

52. The computer program in claim 1, wherein the metadata comprises the metadata that was located outside and external from the programming code.

53. The method of claim 14, wherein: the detecting a change in a programming code development environment further comprises at least one of:
tracking an activity associated with a code developer in the programming code development environment or tools such as a code editor; and
detecting events associated with the code developer making changes by creating or modifying the code during programming activity.

54. The method of claim 53, further including:
integrating with the text editor (IDE) using an available application program interface (API);
capturing developer keyboard sequences and IDE-specific events;
detecting the programming language the developer is writing programming code in either by analysis of the file, or via application program interface (API) methods provided by the text editor (IDE) and using that detected language to perform the search;
detecting the creation or modification of classes, interfaces, functions, methods, properties or fields by analyzing keyboard sequences for syntax used to define such elements as specified by the grammar of the particular programming language; and
extracting the element name and related signature information if available.

55. The method of claim 40, wherein the metadata further comprises:
an xml fragment, embedded in comments of the programming code or in an ancillary file which describes the programming code.

56. The method of claim 8, wherein the method further comprises:
indexing the programming code to generate an index;
the index including keywords found based on text in the programming code with a corresponding count of a frequency of each keyword in the programming code, and the indexing generated by parsing the programming code using a regular expression process including a pattern matching expression process that is specific to a syntax of a particular programming language used in the programming code; and
the searching including comparing the search query with the index to produce a syntax based textual search result.

57. The method of claim 1, further comprising:
generating an index, wherein the index includes keywords found in the programming code with a corresponding count of a frequency of each keyword in the programming code that is generated by parsing the programming code using a regular expression system to find matches of each word using a pattern matching expression that is specific to a syntax of a particular programming language used in the programming code; and
wherein a syntax aware textual search result comprises generating at least one of a (i) textual based search result, and (ii) a textual and syntax based search result, using the index.

58. The computer system of claim 9, wherein:
the indexing engine generating an index, wherein the index includes keywords found in each programming code file with a corresponding count of a frequency of each keyword in the file that is generated by parsing the file using a regular expression system to find matches of each word using a pattern matching expression that is specific to the syntax of the particular programming language used in the file; and
wherein the syntax aware textual search result comprises generating at least one of a (i) textual based search result, and (ii) a textual and syntax based search result, using the index.

59. A computer implemented method, comprising:
generating an index in a processor of the computer, the generating index generation including parsing a programming code file using a regular expression system to find matches of each word of a query relative to words in the programming code using a pattern matching expression that is specific to a syntax of a particular programming language used in the programming code file, and where a table of words and their frequency in the file is generated and maintained by adding each new word found to the table with a frequency count of 1 and incrementing the frequency count in the word table for each additional time the word is found in the file contents;
receiving, in a computer having the processor, the search query for a programming code search engine;
searching, with the search query, a programming code database coupled with the processor,
the programming code database resulting from a full-text analysis of the programming code file;
the search query being in a form of a search criterion that conforms to an underlying storage of text keywords and metadata, the metadata including statistical metadata generated from a statistical analysis component of the full-text analysis, and later using the statistical metadata generated as criteria for searches, the full-text analysis not being programming language specific and not requiring or use a programming language-specific analysis;
the programming code database populated with programming code from one or more repositories of programming code,
the programming code in the programming code database being indexed by use of full-text analysis procedures that treat the programming code file as plain text and that:
(1) creates a full-text index based on a set of keywords found in the programming code file by use of the full-text analysis and the full-text index, and
(2) generates a plurality of different types of statistical information about textual tokens extracted from the full-text analysis;
scoring results of the searching according to a scoring criterion, the scoring criterion including a reuse score that tracks a copying for reuse of a a line of programming instructions of the programming code in the programming code database; and
presenting the results of the searching in a ranked order according to the scoring, the results being a subset of the programming code file.

* * * * *